(12) United States Patent
Stanwood et al.

(10) Patent No.: US 7,990,944 B2
(45) Date of Patent: Aug. 2, 2011

(54) CONTENTION-BASED COMMUNICATION

(75) Inventors: Kenneth L. Stanwood, Vista, CA (US);
Paul W. Piggin, Wiltshire (GB); Lei Wang, San Diego, CA (US); Brian D. Petry, San Diego, CA (US); Roger Marks, San Diego, CA (US); Yair Bourlas, San Diego, CA (US)

(73) Assignee: Wi-LAN, Inc., Ottawa, Ontario (CA)

( * ) Notice: Subject to any disclaimer, the term of this patent is extended or adjusted under 35 U.S.C. 154(b) by 564 days.

(21) Appl. No.: 11/851,362

(22) Filed: Sep. 6, 2007

(65) Prior Publication Data

US 2009/0067448 A1    Mar. 12, 2009

(51) Int. Cl.
*H04J 3/06* (2006.01)
(52) U.S. Cl. .......................... 370/350; 370/329; 455/455
(58) Field of Classification Search .................. 370/445, 370/447, 350, 329
See application file for complete search history.

(56) References Cited

U.S. PATENT DOCUMENTS

| | | | | |
|---|---|---|---|---|
| 6,920,171 B2* | 7/2005 | Souissi et al. | ................. | 375/133 |
| 7,523,205 B1* | 4/2009 | Sherman | ....................... | 709/226 |
| 2004/0023649 A1* | 2/2004 | Bing et al. | ................. | 455/422.1 |
| 2006/0291430 A1* | 12/2006 | Putzolu et al. | ................. | 370/335 |
| 2007/0248076 A1* | 10/2007 | Ji et al. | ........................... | 370/350 |
| 2008/0089280 A1* | 4/2008 | Hu | ................................. | 370/329 |
| 2008/0107061 A1* | 5/2008 | Tao et al. | ....................... | 370/315 |
| 2008/0109711 A1* | 5/2008 | Morioka et al. | ............... | 714/807 |
| 2008/0198815 A1* | 8/2008 | Liu | ................................. | 370/336 |
| 2009/0296591 A1* | 12/2009 | Urabe et al. | ................... | 370/252 |

FOREIGN PATENT DOCUMENTS

JP    04185029 A  *  7/1992  ................... 370/445

* cited by examiner

*Primary Examiner* — Huy D Vu
*Assistant Examiner* — Maria Sekul
(74) *Attorney, Agent, or Firm* — Volpe and Koenig, P.C.

(57) ABSTRACT

For an example embodiment, a method for a communication device operating in a synchronous communication system is described. The method includes performing a listen-before-talk (LBT) procedure prior to the start of a downlink subframe of a synchronous frame and determining if a transmission from another communication device of another communication system is detected during the LBT procedure. In the case that a transmission is detected during the LBT procedure, the communication device refrains from transmitting during the downlink subframe. In the case that a transmission is not detected during the LBT procedure, the communication device transmits during the downlink subframe.

3 Claims, 26 Drawing Sheets

Interference between
Asynchronous and
Synchronous Systems

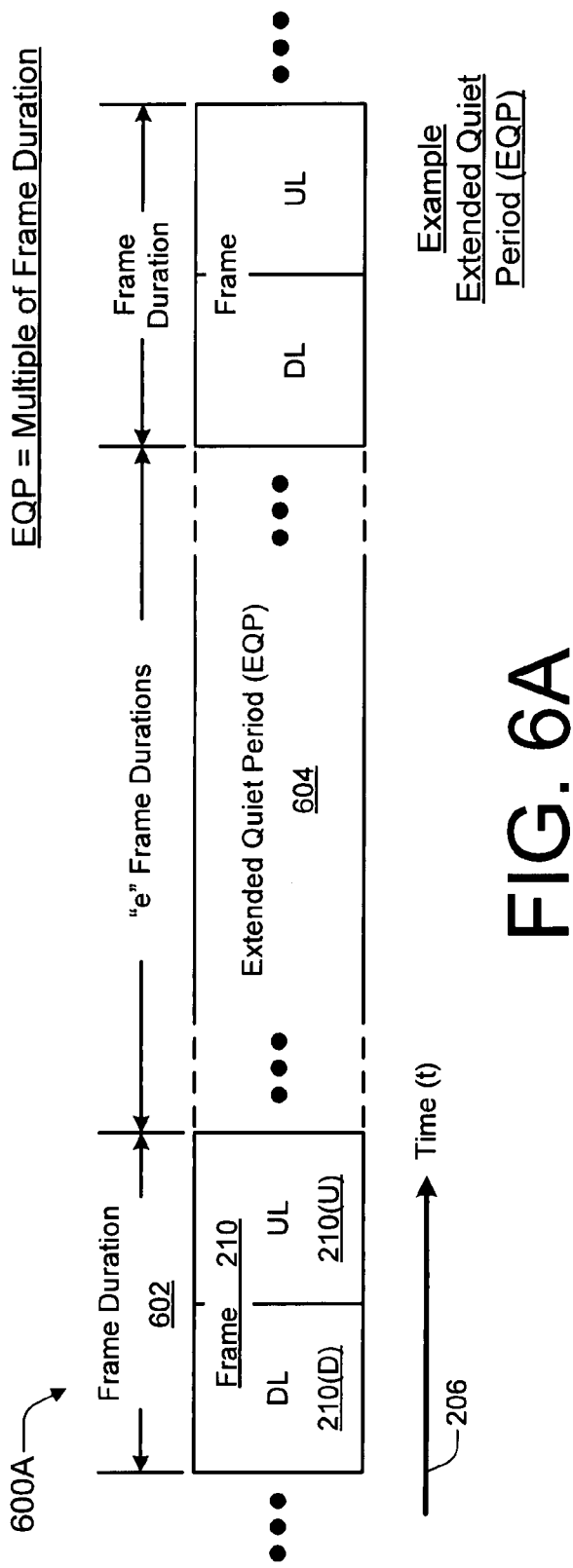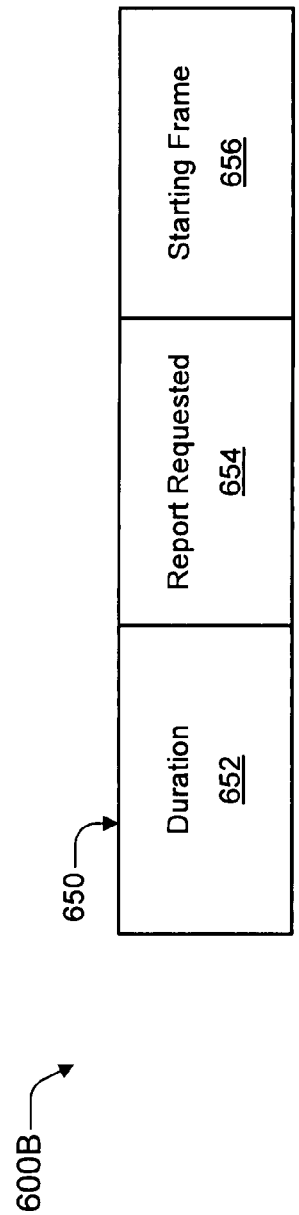
FIG. 6A
FIG. 6B

800A
Example Method for Establishing an EQP

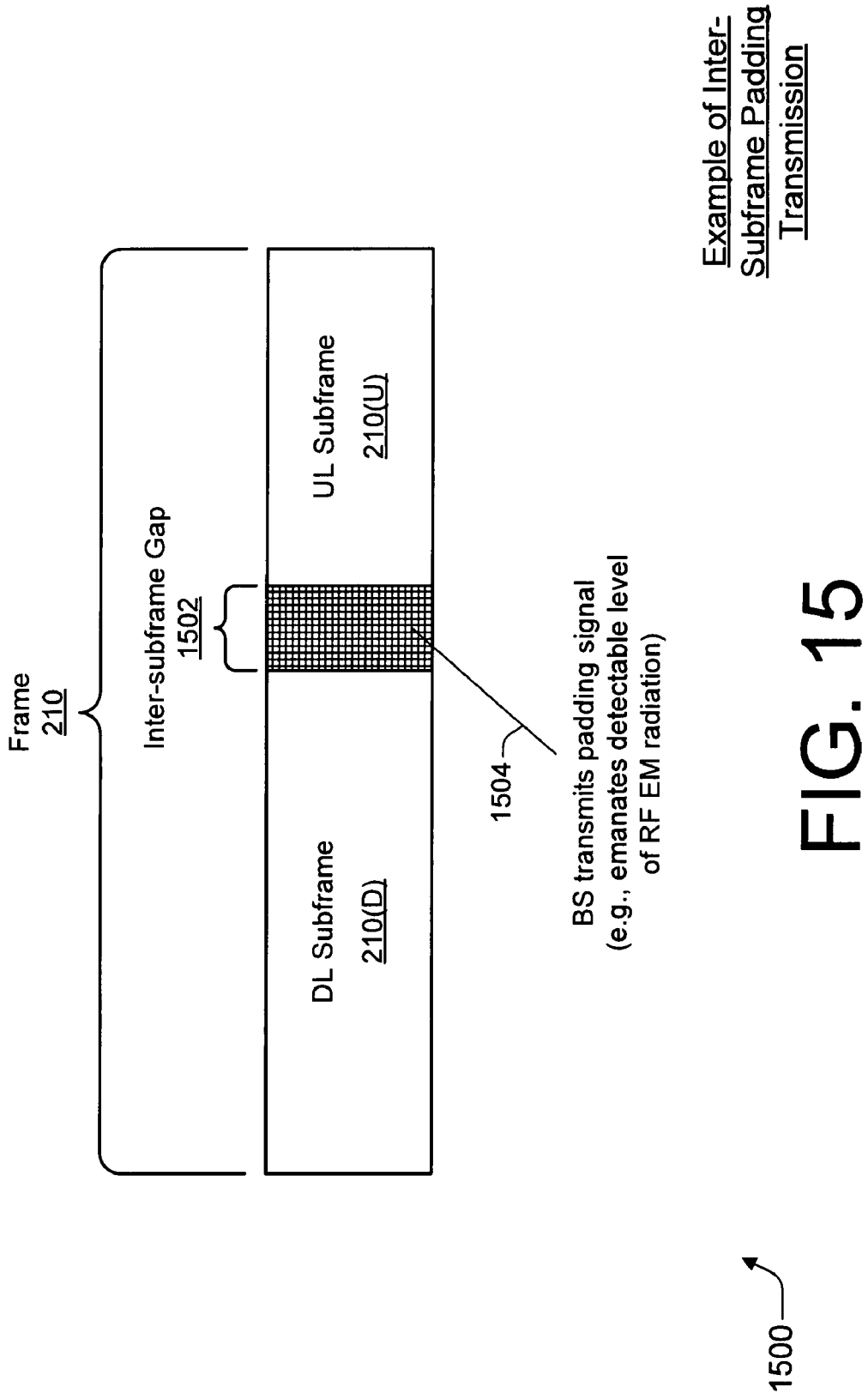

1600A — High-Level Example of Dynamic Medium Access with FRS Transmission

CONTENTION-BASED COMMUNICATION

BACKGROUND

Wireless communication is becoming omnipresent in today's society as people increasingly use cordless phones, cellular phones, wireless data communication devices, and the like on a daily basis. The ability to communicate wirelessly has become pervasive in homes, in businesses, at retail establishments, on the roadways, and in the outdoors generally. Consequently, people can now communicate while in transit and in almost any environment.

Wireless communication involves the use of a limited resource: the electromagnetic spectrum. Different wireless communication schemes utilize different bands or segments of the electromagnetic spectrum in different manners. Typically, each particular segment of the electromagnetic spectrum is utilized in accordance with at least one wireless standard that has been created by a government entity, an industry consortium, and/or some other regulatory body.

The various wireless standards may each be placed into one or more categories reflecting different types of wireless communication. An example wireless communication type is synchronous communication. With synchronous communication, time may be divided into regular periodic intervals and communications may be repeatedly transmitted during these regular intervals. On one hand, the predictable, orderly nature of synchronous communication can provide efficiencies with respect to how a particular segment of the electromagnetic spectrum is utilized. On the other hand, a system employing synchronous communication can tend to monopolize the particular electromagnetic spectrum segment that it uses to the exclusion of other systems. In contrast, asynchronous communication does not schedule transmissions during regular periodic time intervals, but instead communications are initiated when needed by an initiating device. Such asynchronous communication can often occur in bursts in correlation to the needs of an application being used in the device that initiates the communication.

SUMMARY

Multiple different embodiments for a contention-based system and/or protocol are described herein. The described embodiments may be implemented individually or jointly. Example embodiments include, but are not limited to, dynamic channel selection, interferer identification, extended quiet periods, adaptive extended quiet periods, listening before talking, dynamic medium access, and combinations of such embodiments.

In an example embodiment, a method for a communication device operating in a synchronous communication system includes performing a listen-before-talk (LBT) procedure prior to the start of a downlink subframe of a synchronous frame and determining if a transmission from another communication device of another communication system is detected during the LBT procedure. In the case that a transmission is detected during the LBT procedure, the communication device refrains from transmitting during the downlink subframe. In the case that a transmission is not detected during the LBT procedure, the communication device transmits during the downlink subframe.

In another example embodiment, a method for a communication device operating in a synchronous communication system includes operating the communication device at a current duty cycle that sets an operational ratio at which extended quiet periods (EQPs) are provided for the synchronous communication system, determining if an interferer device is detected within the synchronous communication system, and refraining from synchronous transmissions during the EQPs. The method further includes decreasing the current duty cycle if an interferer device is determined to be detected within the synchronous communication system and increasing the current duty cycle if an interferer is not determined to be detected within the synchronous communication system.

However, other method, system, apparatus, device, media, procedure, arrangement, etc. embodiments for the invention are described herein.

BRIEF DESCRIPTION OF THE DRAWINGS

The same numbers are used throughout the drawings to reference like and/or corresponding aspects, features, and components.

FIG. 6A is a block diagram illustrating an example of an extended quiet period (EQP).

FIG. 6B is a block diagram illustrating an example of an EQP instruction communication (IC).

FIG. 15 is a block diagram illustrating an example super-packet scenario that includes transmission of padding data.

DETAILED DESCRIPTION

Introduction to Contention-Based Protocol

Figure 1:
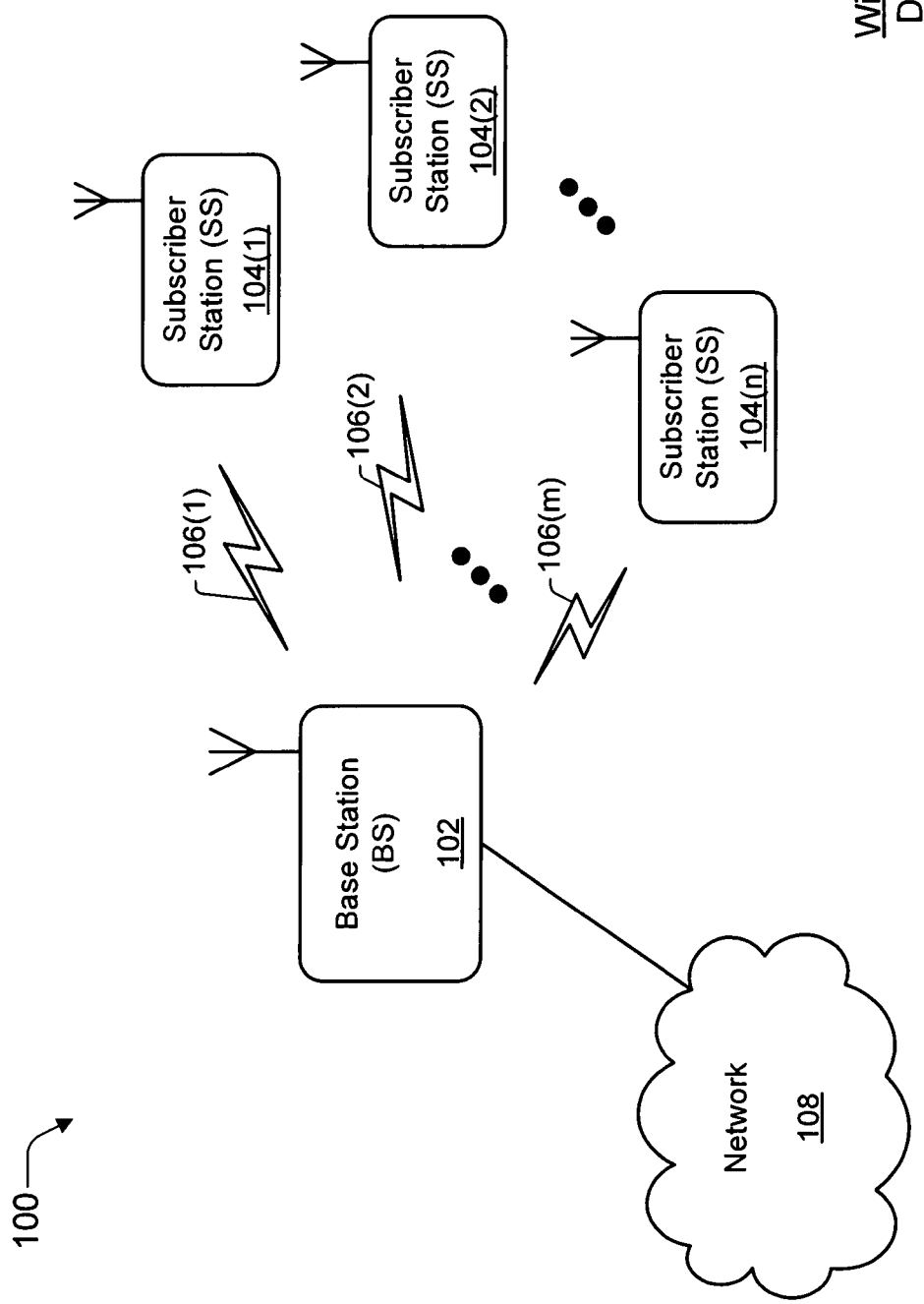
FIG. 1 is a block diagram of an example wireless environment having multiple wireless devices and multiple communication links in which various aspects of a contention-based system of the invention may be implemented.

For a contention-based system of the present invention, multiple example embodiments are described herein. Any of the embodiments may be employed in an environment in which there is the possibility of contention for a given portion of the electromagnetic spectrum, including by way of example those bands of spectrum that are non-exclusively licensed. A given contention-based protocol that is adopted by a communications device may involve any one or more of the described embodiments, either individually or jointly in any combination. Example embodiments include, by way of example but not limitation, dynamic channel selection, interferer identification, extended quiet periods (EQPs), adaptive EQPs (AEQPs), listening-before-talking (LBT), and so forth. Although many of the environments, protocols, devices, and other embodiments that are described herein pertain to wireless methods, systems, etc., the present invention may also be implemented in conjunction with wired environments, wired protocols, wired devices, and other wired embodiments.

In an example embodiment, dynamic channel selection involves selecting a vacant channel for communication if one is available and selecting a best channel otherwise. In another example embodiment, interference identification involves identifying a type of a discovered interferer. Example interferer types include, by way of example but not limitation, a specific spectrum user (SSU), an asynchronous channel user, a synchronous channel user, and so forth. Devices operating in accordance with IEEE 802.16 communicate using synchronous channels. Devices operating in accordance with IEEE 802.11 communicate using asynchronous channels. Other standards may also employ synchronous channels, asynchronous channels, or both types of channels.

In yet another example embodiment, EQPs are established. A minimum quiet period is determined based on a potential interferer type. The minimum quiet period may be determined based on a maximum packet duration of the potential interferer type. A duration for the EQP that is an integral number of synchronous frames is ascertained responsive to the determined minimum quiet period. This ascertained EQP may be communicated from a base station to other wireless devices. An EQP may thus be adhered to by subscriber stations within the coverage area of the base station during which they refrain from transmitting for a stipulated number of synchronous frames for an EQP duration.

In yet another example embodiment, an EQP is adaptively implemented. A synchronous wireless device adopts a duty cycle that governs the ratio at which an EQP is produced within a synchronous wireless system. Generally, the duty cycle is decreased toward a predefined sharing level when an interferer is detected, and the duty cycle is increased toward a predefined maximum level when no interferer is detected over a predetermined time period.

In yet another example embodiment, a synchronous wireless device implements an LBT procedure. The synchronous wireless device may be a base station and/or a subscriber station. A transmission detection by a base station causes the base station to refrain from transmitting in a downlink (DL) subframe of a current frame. In a synchronous system in which a base station schedules uplink (UL) transmissions, the UL subframe is consequentially unscheduled because no UL map was disseminated in the DL subframe, and therefore no uplink transmissions occur. This may be the current frame or a future frame, depending on the instituted UL map relevance. A transmission detection by one or more subscriber stations causes them to refrain from transmitting during an UL subframe, but other non-detecting subscriber stations may still transmit during the UL subframe.

Other additional example embodiments are also described herein. For instance, a semi-synchronous LBT embodiment is described in which synchronous transmission re-commences upon cessation of a detected transmission. The synchronous transmission may therefore begin without waiting for a regularly-scheduled interval to conclude. The synchronous transmission thus initiates a new synchronized transmission timing scheme after an LBT procedure detects a transmission. As another instance, transmission of a padding signal is described in which padding data may be transmitted between DL and UL subframes of a synchronous frame to create what effectively appears to external observers to be a continuous super-packet, thereby preventing other systems from beginning transmission during the time gap between the DL and the UL subframes.

FIG. 1 is a block diagram of an example wireless environment 100 having multiple wireless devices 102 and 104 as well as multiple communication links 106. Various aspects of a contention-based system of the invention may be implemented in wireless environment 100. As illustrated, wireless environment 100 includes a base station 102, one or more networks 108, "n" subscriber stations 104, and "m" communication links 106, with "n" and "m" being the same or different integers. Although a single respective communication link 106 is shown as being associated with each respective subscriber station (SS) 104, each subscriber station 104 may be simultaneously participating in multiple communication links 106.

Wireless communications environment 100 is representative generally of many different types of wireless communications environments, including but not limited to those pertaining to wireless local area networks (wireless LANs) (e.g., Wi-Fi or WiMAX technology); wireless wide area networks (wireless WANs) (e.g., WiMAX technology); ad hoc wireless networks (e.g., Wi-Fi or Bluetooth technology); cellular technology (including so-called personal communication services (PCS)); wireless metropolitan area networks (wireless MANs), including hybrid or multi-use (e.g., WiMAX) technology; some combination thereof; and so forth.

In wireless communications environment 100, base station (BS) 102 is in wireless communication with subscriber stations 104(1), 104(2) . . . 104(n) via wireless communications or communication links 106(1), 106(2) . . . 106(m), respectively. Although implementations may vary, base station 102 is typically fixed, and subscriber stations 104 are usually mobile, nomadic, or stationary. Although wireless communications environment 100 depicts base station 102 as communicating with "n" subscriber stations 104 in one general direction, base station 102 may actually be communicating with any number of subscriber stations 104 in any number of directions, including in different sectors or omni-directionally.

As illustrated, base station 102 is capable of accessing network(s) 108. Network(s) 108 may be one or more of a wired network, another wireless network, a combination thereof, and so forth. Access to network 108 enables base station 102 to forward data from subscriber stations 104 to external network locations and vice versa. Network(s) 108 may also be used for backhaul purposes. Examples of network 108 include, by way of example but not imitation, the internet, a landline telephone network, another wireless network, wired nodes of the overall network of base station 102, LANs/WANs/MANs, some combination thereof, etc. that are operating in accordance with any given communication standard or standards.

Base station 102 may be, for example, a nexus point, a trunking radio, a switch or router, an access point, a traditional cellular base transceiver station (BTS), some combination and/or derivative thereof, and so forth. Subscriber stations 104 may be, for example, a hand-held device; a server, client, personal, desktop, notebook, tablet, and/or palm-top computer; a wireless expansion card, module, adapter, or similar apparatus that is coupled to a computer or other device; a storage device; a set-top box or other television-related device; a personal digital assistant (PDA) or portable entertainment device; a mobile phone or other mobile appliance; a vehicle having a wireless communications capability; a wireless router; a node of a wireless mesh network; a portable inventory-related scanning device; any device capable of processing generally; some combination thereof; and so forth. It should be understood that any wireless device may implement the functionality or perform the role of a base station 102 or a subscriber station 104, including at different times and/or with respect to different networks.

Base station 102 may interact with subscriber stations 104 in accordance with any individual or combined standardized and/or specialized air interface technologies and/or wireless schemes. Example air interface technologies include, by way of example but not limitation, an IEEE 802.11 standard, an IEEE 802.16 standard, an IEEE 802.22 standard, various cellular phone standards, some combination or derivative thereof, or any other such technology. Example wireless schemes include, by way of example but not limitation, orthogonal frequency division multiple access (OFDMA) schemes, including both time division duplexing (TDD) and frequency division duplexing (FDD); orthogonal frequency division multiplexing (OFDM) schemes, including both TDD and FDD; time division-code division multiple access (TD-CDMA) schemes; single carrier (SC) schemes; time division multiplexing (TDM) schemes; some combination thereof; and so forth. Moreover, such schemes can include those requiring line of sight (LOS) communications as well as those that provide non-line of sight (NLOS) communications.

Figure 2A:
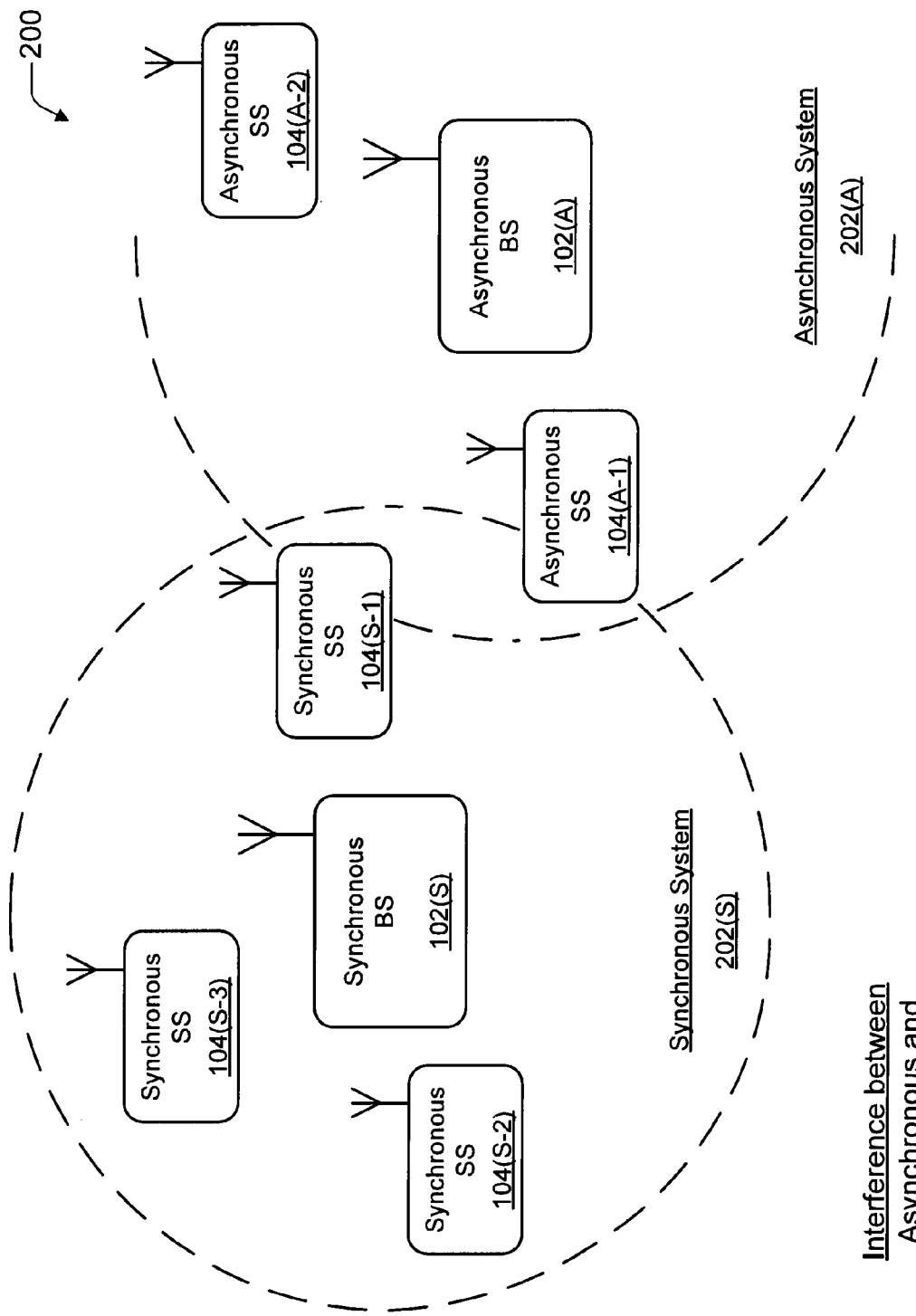
FIG. 2A is a block diagram of an example environment illustrating interference between a synchronous system and an asynchronous system.

FIG. 2A is a block diagram of an example environment 200 illustrating interference between a synchronous system 202 (S) and an asynchronous system 202(A). As illustrated, each system 202 of interference environment 200 includes a base station 102 and multiple subscriber stations 104. Synchronous system 202(S) includes a synchronous base station 102 (S), synchronous subscriber station 104(S-1), synchronous subscriber station 104(S-2), and synchronous subscriber station 104(S-3). Asynchronous system 202(A) includes an asynchronous base station 102(A), asynchronous subscriber station 104(A-1) and asynchronous subscriber station 104(A-2).

An approximate coverage area for each system 202 is indicated by a dashed circular or semi-circular line. Although not so explicitly illustrated, the amount of interfering overlap may be of any amount. In fact, the geographic coverage areas may overlap so much as to be coextensive, or the geographic coverage areas may not actually overlap so long as an electromagnetic emanation from one wireless device of one system is detectable by another wireless device in the other system. Additionally, each system 202 may alternatively include different numbers of base stations 102 and/or subscriber stations 104, including possibly none.

Interference may be created by a base station 102 or a subscriber station 104, and interference may also impact (e.g., be detectable by) a base station 102 or a subscriber station 104. For example, asynchronous subscriber station 104(A-1) may send a transmission that is detectable by synchronous subscriber station 104(S-1) and/or synchronous base station 102(S). Also, asynchronous base station 102(A) may send a transmission that is detectable by synchronous subscriber station 104(S-2) and/or synchronous base station 102(S).

Similarly, synchronous subscriber station 104(S-1) may send a transmission that is detectable by asynchronous subscriber station 104(A-2) and/or asynchronous base station 102(A). Also, synchronous base station 102(S) may send a transmission that is detectable by asynchronous subscriber station 104(A-1) and/or asynchronous base station 102(A). Any of these combinations of transmissions and detections can constitute interference between synchronous system 202 (S) and asynchronous system 202(A).

Figure 2B:
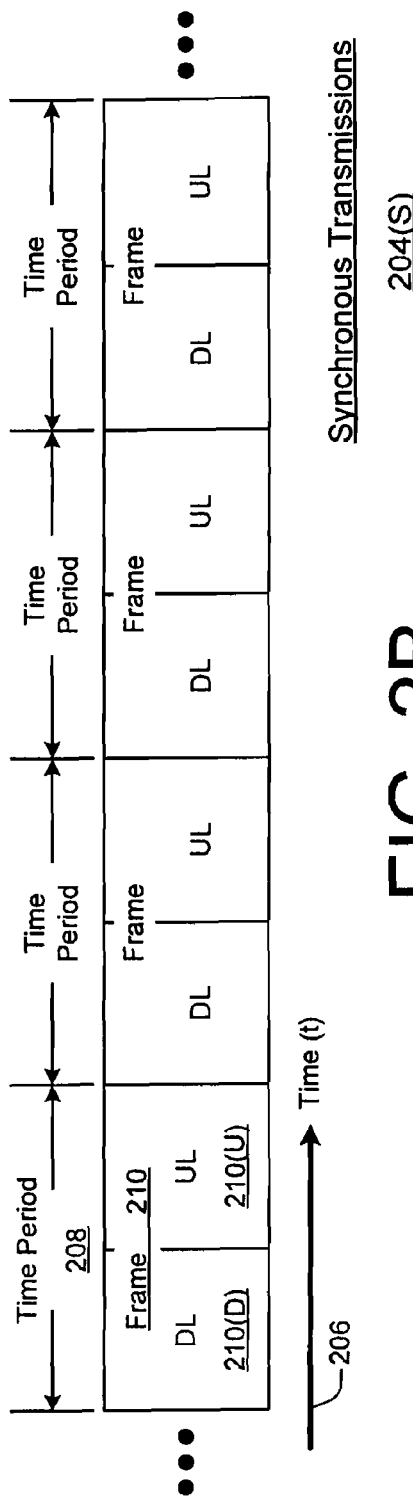
FIGS. 2B and 2C are block diagrams illustrating examples of synchronous transmissions and asynchronous transmissions, respectively.
Figure 2C:
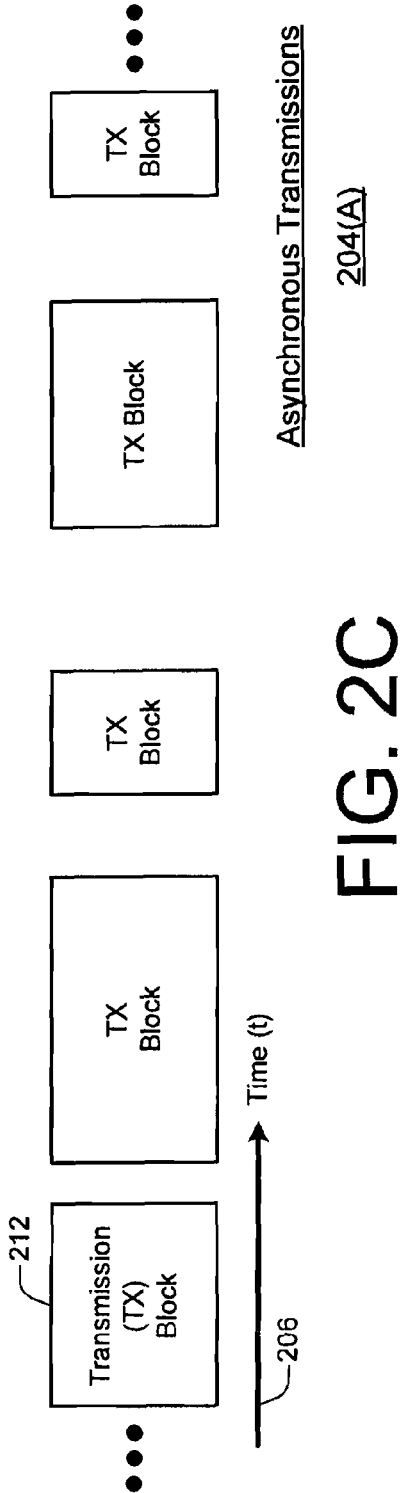

FIGS. 2B and 2C are block diagrams illustrating examples of synchronous transmissions and asynchronous transmissions, respectively. FIG. 2B illustrates a synchronous transmission 204(S), and FIG. 2C illustrates an asynchronous transmission 204(A). Each includes an axis arrow 206 indicating that time (t) is increasing in the rightward direction.

With synchronous transmission 204(S) as shown in FIG. 2B, time axis 206 is divided into regular intervals denoted as time periods 208. Communications are repeatedly transmitted during these regular intervals in blocks termed frames 210. Each frame 210 is segregated into a downlink (DL) subframe 210(D) and an uplink (UL) subframe 210(U). Each frame 210 starts at a predetermined time in accordance with the regular time period 208 interval. By way of example only, systems operating in accordance with an IEEE 802.16 standard employ a synchronous transmissions air interface technology.

In contrast, there are no regular time periods with asynchronous transmission 204(A) as shown in FIG. 2C. Asynchronous transmission 204(A) includes multiple transmission (TX) blocks 212 along time axis 206. Each transmission block 212 may be of a varying and unpredictable duration. Furthermore, each transmission block 212 may begin at an unknown and unannounced time. By way of example only, systems operating in accordance with an IEEE 802.11 standard employ an asynchronous transmissions air interface technology.

As more and more wireless systems are made operational, geographic overlap and spectrum crowding increase. Hence, the likelihood that one system will interfere with another increases. Usually, systems of one type are designed to mitigate interference with other systems of the same type. For example, one synchronous system can be adapted to share spectrum with another synchronous system.

It is, however, more difficult for systems of different types to adapt to each other in order to share the same spectrum. For example, a synchronous system and an asynchronous system having overlapping geographic coverage and spectrum allocation can interfere with each other in manners that are not ameliorated by interference mitigation techniques that are effective between two systems of the same type. This occurs, at least partly, because of the nature of synchronous transmissions 204(S) in comparison to asynchronous transmissions 204(A).

For example, the orderly and predictable nature of synchronous transmissions 204(S) can be severely impacted by the sudden and unexpected appearance of transmission blocks 212 of asynchronous transmissions 204(A). Similarly, the relatively constant electromagnetic emanations of frames 210 of synchronous transmissions 204(S) can effectively block out the relatively sporadic transmissions of asynchronous systems.

Employing one or more example approaches to a contention-based protocol as described herein can facilitate systems of different types being able to operate in overlapping geographic areas and allocated spectrum ranges, including within non-exclusively licensed bands. For example, a synchronous system can implement one or more of the example embodiments in order to coexist with an asynchronous system. Unidirectional and/or bidirectional interference between such systems may therefore be mitigated.

Although features and concepts of the described systems, methods, devices, scenarios, media, etc. for contention-based protocol mechanisms can be implemented in any number of different environments, communications systems, processing-based systems, structures, and/or other configurations, example embodiments are described in the context of the following example systems and environments.

Example Embodiments for Contention-Based Protocol

Figure 3A:
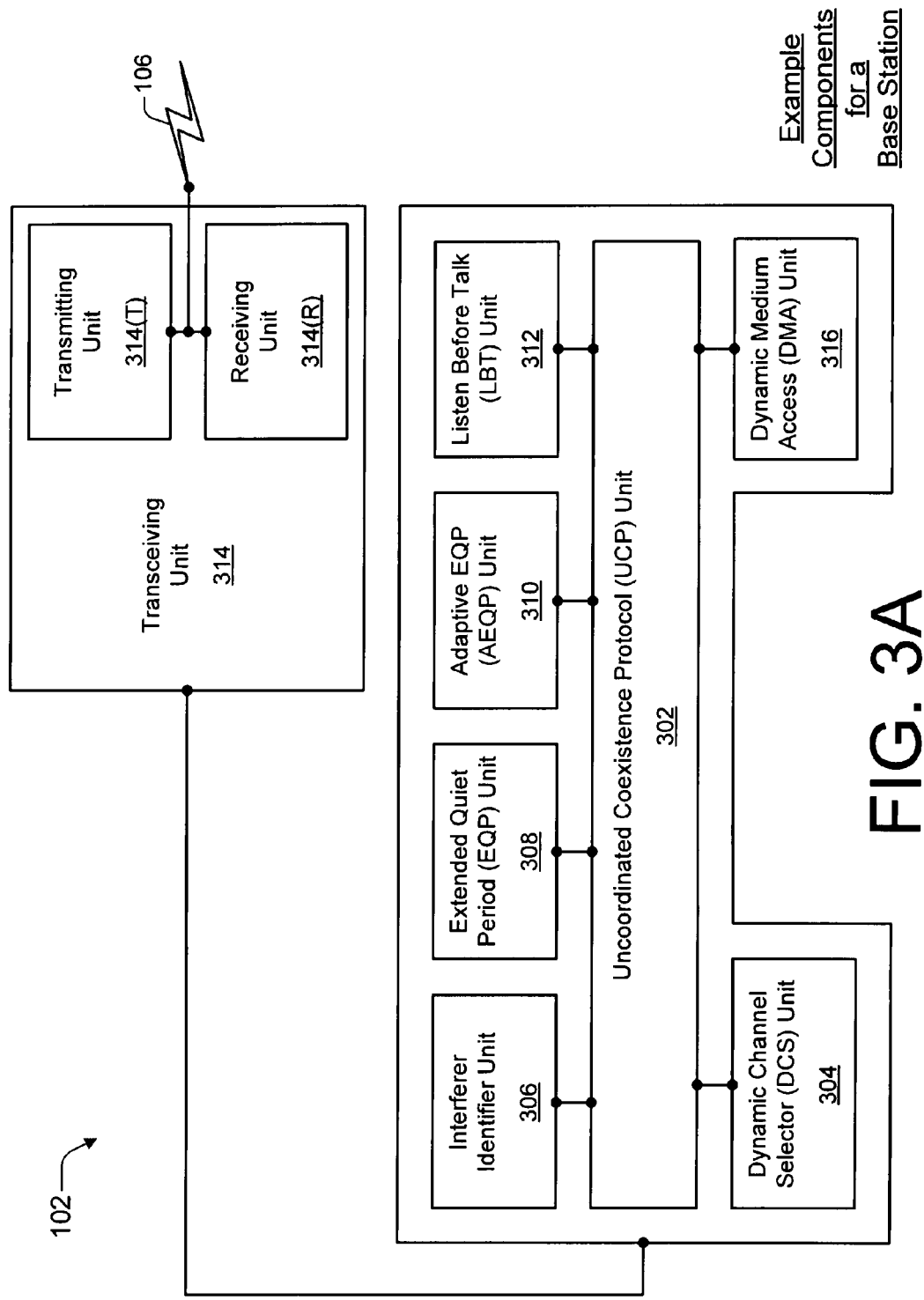
FIGS. 3A and 3B are block diagrams illustrating example components of a base station and a subscriber station, respectively, that can be utilized to implement example embodiments of a contention-based protocol.
Figure 3B:
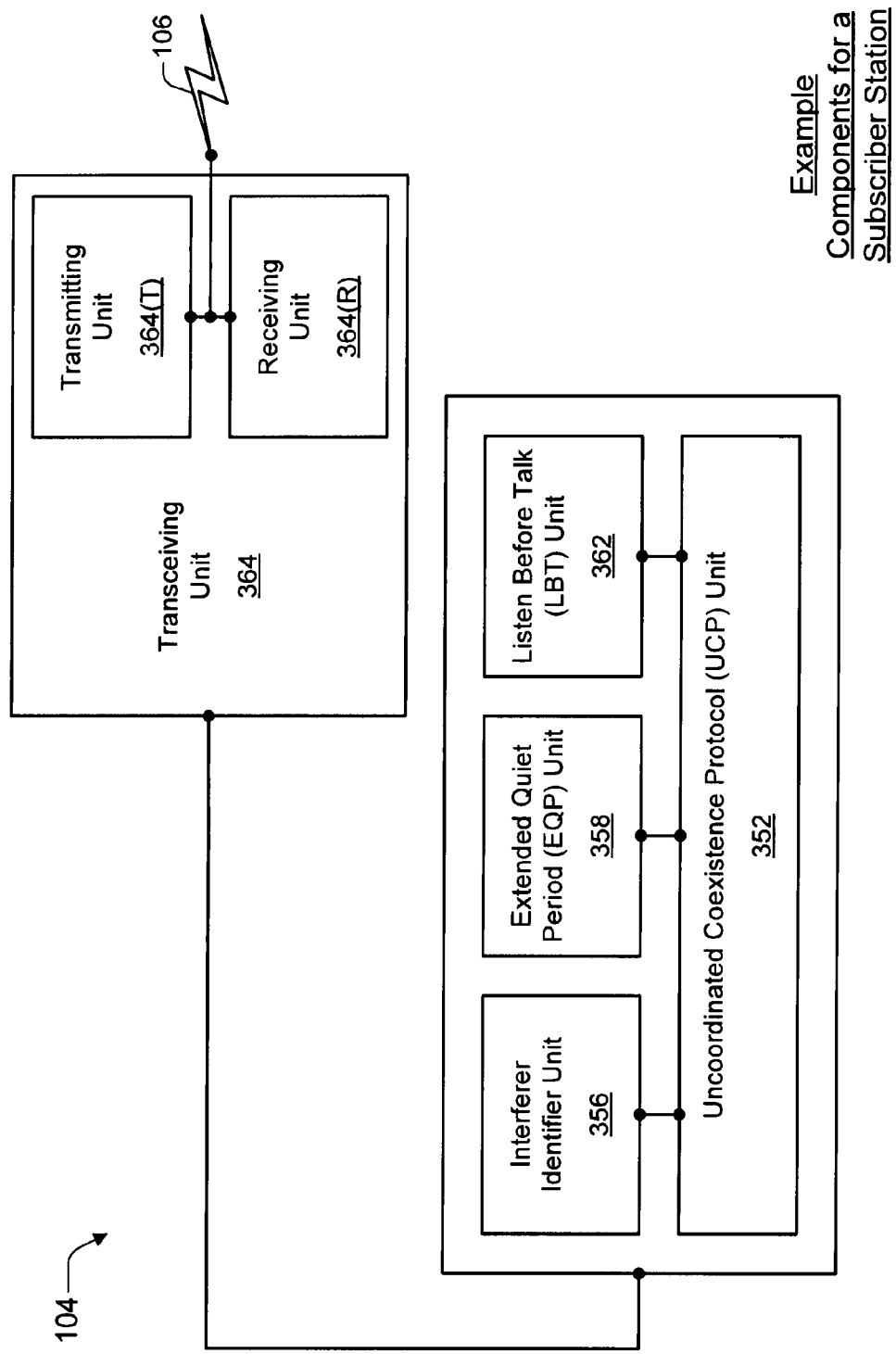

FIGS. 3A and 3B are block diagrams illustrating example functional components of a base station 102 and a subscriber station 104, respectively, that can be utilized to implement example embodiments for a contention-based protocol. Base station 102 and subscriber station 104 may be considered communication devices generally. An example general device is described further herein below with particular reference to FIG. 18. By way of example only, the illustrated components of FIGS. 3A and 3B may be implemented in base stations and subscriber stations that are operating in synchronous systems using synchronous transmissions.

As illustrated in the embodiment shown in FIG. 3A, the components of base station 102 include an uncoordinated coexistence protocol (UCP) unit 302, a dynamic channel selector (DCS) unit 304, an interferer identifier unit 306, an extended quiet period (EQP) unit 308, an adaptive EQP (AEQP) unit 310, a listen-before-talk (LBT) unit 312, a dynamic medium access (DMA) unit 316, and at least one transceiving unit 314. Components 302-316 of base station 102 may be embodied as software, firmware, hardware (including user-operated controls), fixed logic circuitry, some combination thereof, and so forth.

Transceiving unit 314 includes a transmitting unit 314(T) and/or a receiving unit 314(R). Transceiving unit 314 enables base station 102 to communicate wirelessly via communication links 106. Transmitting unit 314(T) and receiving unit 314(R) may include one or more, and usually multiple, transmitters or receivers, respectively, and/or one or more transmitting chains or receiving chains. Each transmitter and receiver may include one or more radios (not explicitly shown) that are dedicated or shared. Transceiving unit 314 may also be adapted for use with a wired communications medium.

In an example embodiment, UCP unit 302 implements a contention-based protocol in conjunction with one or more of DCS unit 304, interferer identifier unit 306, EQP unit 308, AEQP unit 310, and LBT unit 312. UCP unit 302 coordinates those other units that are included in a given base station implementation. Any of the units that are present may be activated singularly or in combination by UCP unit 302 of base station 104. In one embodiment, UCP unit 302 always utilizes at least LBT unit 312, and may also utilize one or more of the other units for other types of contention based protocol schemes in addition to LBT.

In an example embodiment, DCS unit 304 selects an appropriate channel, for example when a base station undergoes system startup. DCS unit 304 may also attempt a new channel selection at regular intervals, when a usage level of a current channel reaches a predefined threshold, during periods of non-transmission, and so forth. Channel selection may also entail frequency selection. Channel selection may also be performed at least partially manually.

In operation, DCS unit 304 scans the channels of a set of channels that are available to a particular base station. Which channels are available may be based on a wireless standard, an allocated frequency band, a frequency planning scheme, some combination thereof, and so forth. DCS unit 304 searches for a vacant channel during the scanning. A vacant channel may be any channel in which the base station does not detect a transmission and therefore is likely to be free of other users. If a vacant channel is found in the set of available channels, DCS unit 304 selects the vacant channel for communication.

If a vacant channel is not detected, DCS unit 304 searches for a best channel. Characteristics defining a best channel may be specified by a vendor and/or operator of the base station. Example best channel characteristics include, but are not limited to, absence of a specific spectrum user (SSU), least channel utilization over time, lowest detected signal strength, greatest distance to nearest other user(s) generally or another base station specifically, fewest number of other users, some combination thereof, and so forth. Other example DCS functionality that may be implemented by DCS unit 304 is described herein below with particular reference to FIG. 4.

In an example embodiment, interferer identifier unit 306 identifies the presence of an interferer and may also identify a type of the discovered interferer. The presence of an interferer may, for example, be detected by detecting the existence of noise above a predetermined threshold. Other mechanisms of an example contention-based protocol may depend on an identified type of an interferer. For example, DCS unit 304 may consider any channel with an identified SSU as not being a best channel or as not being selectable at all.

During operation of a base station or a subscriber station, an interferer may be discovered. The discovery of the interferer may be performed by another component or by interferer identifier unit 306, either alone or in conjunction with another component. Interferers may be considered, for example, to be other users and/or their signals that are not communicating with the base station but are emanating transmissions that are detectable above a predetermined threshold by the base station (or a subscriber station communicating with the base station).

Once an interferer is discovered, its transmissions are analyzed by interferer identifier unit 306. The analysis may entail, by way of example but not limitation, the frequency band of the transmission, the regularity of the transmission, the duration of each transmission, content (e.g., beacon information) of each transmission, the wireless access scheme of the transmission, some combination thereof, and so forth. This analysis enables interferer identifier unit 306 to ascertain a type of a discovered interferer. Example interferer types include, but are not limited to, an SSU, an asynchronous user, a synchronous user from another system, and so forth. Other example interferer identification functionality that may be implemented by interferer identifier unit 306 is described herein below with particular reference to FIG. 5.

In an example embodiment, EQP unit 308 establishes EQPs for a synchronous wireless system. EQPs can enable users of a coexisting asynchronous wireless system to have an opportunity to transmit a packet. In fact, with certain embodiments, EQPs can provide a sufficient opportunity for asynchronous users to transmit a packet that is a maximum length with regard to their respective asynchronous wireless standards. EQP unit 308 establishes an EQP that is an integral number of frame durations of the synchronous system of the base station.

EQP unit 308 facilitates uncoordinated coexistence between an operating synchronous system of the base station and any asynchronous systems that are in interference range of the base station coverage area. EQP unit 308 determines a minimum EQP duration based on a maximum packet duration associated with an assumed type of interfering asynchronous system. The greatest maximum packet duration from among each of the discovered interfering asynchronous systems (if more than one) may be used in the minimum EQP duration determination.

Figure 7A:
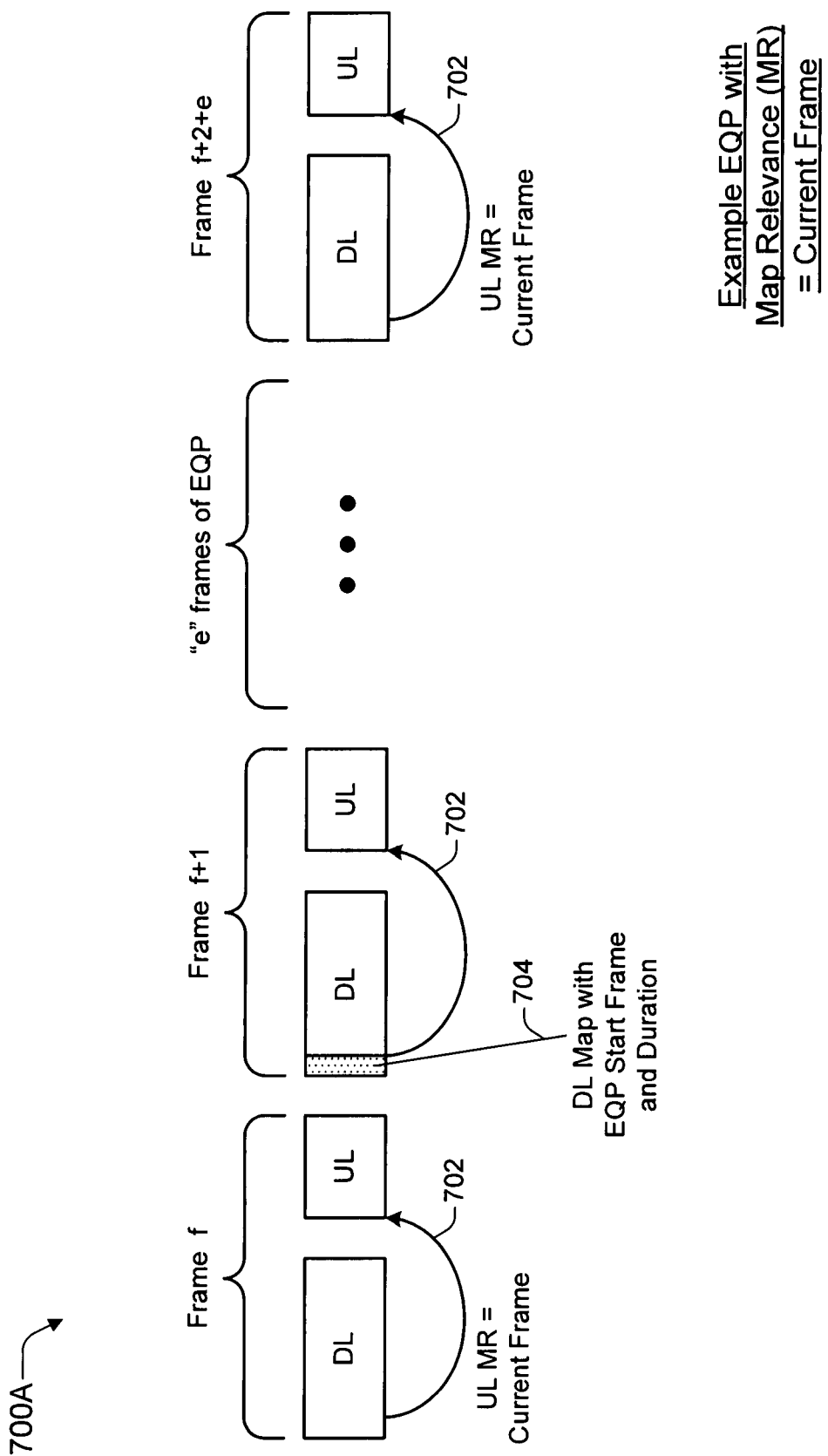
FIGS. 7A and 7B are block diagrams illustrating example EQP scenarios with map relevancies of a current frame and a future frame, respectively.
Figure 7B:
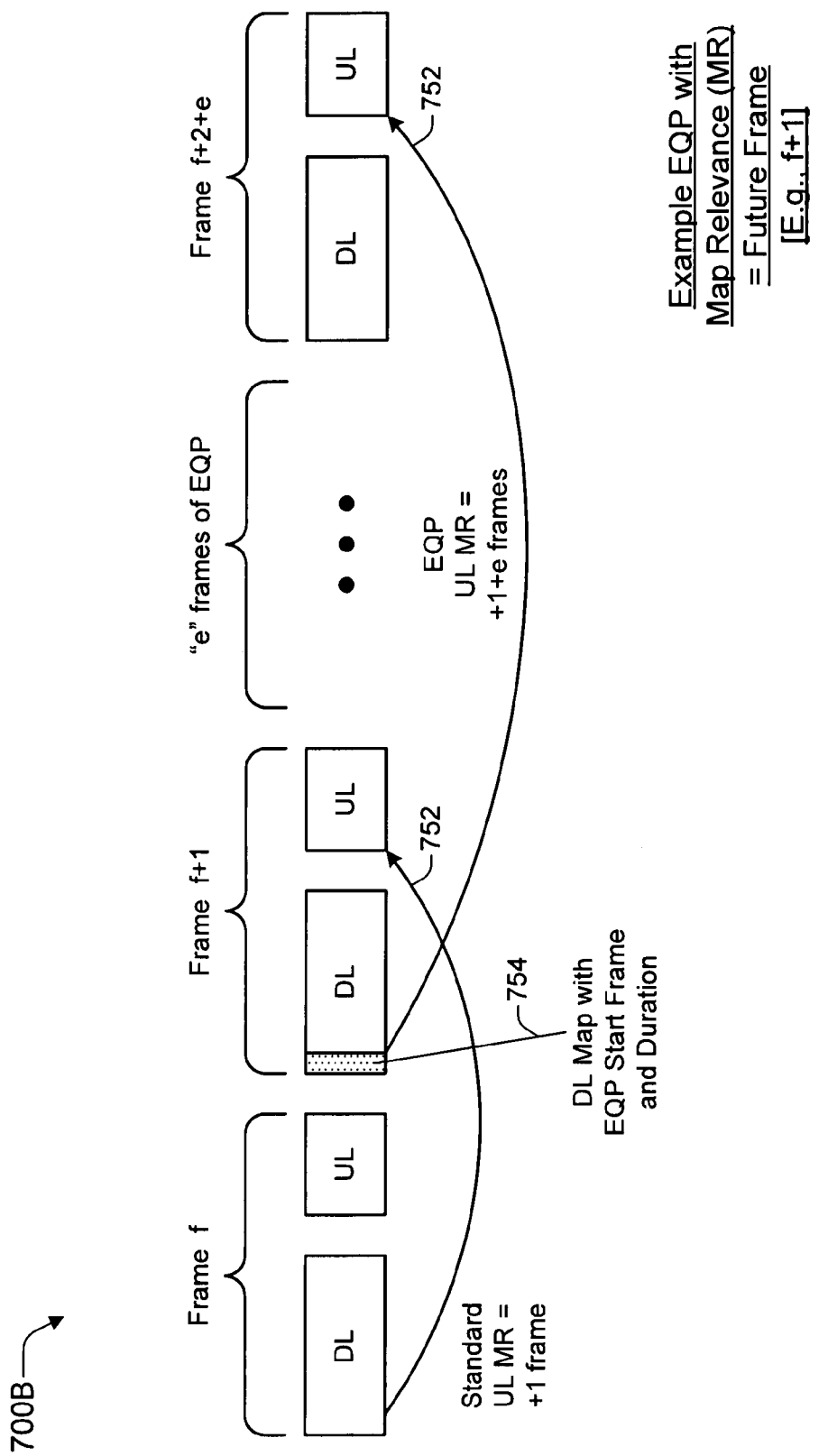

EQP unit 308 ascertains the fewest number "e" of synchronous transmission frames, with "e" being an integer, to equal or exceed the determined minimum EQP duration. This number of synchronous frames forms the EQP. An instruction for the EQP is then transmitted by the base station to the subscriber stations of the base station through the use of an instruction communication (IC). The EQP IC includes an EQP duration that may be expressed as the number of frames "e" forming the EQP. It may also include a starting frame indication and/or a measurement and reporting indication. During the EQP, both the base station and its subscriber stations refrain from transmitting. Other example EQP functionality that may be implemented by EQP unit 308 is described herein below with particular reference to FIGS. 6A, 6B, and 8A. FIGS. 7A and 7B additionally illustrate two example EQP scenarios with different map relevancies.

In an example embodiment, AEQP unit 310 alters an effective ratio of the EQP in dependence upon whether interferers are discovered. For example, a duty cycle may be adjusted based on whether or not an interferer is discovered. A duty cycle reflects a temporal ratio at which an EQP is implemented within a wireless environment. The duty cycle also reflects a relative portion of time that a base station is free to transmit without providing an EQP.

Hence, the higher the duty cycle ratio that a base station is operating under, the more frequently the base station is transmitting and the less frequently the base station is providing an EQP, thereby decreasing the opportunities for asynchronous systems to transmit but increasing the available bandwidth of the synchronous system. Conversely, the lower the duty cycle ratio that a base station is operating under, the less frequently the base station is transmitting and the more frequently the base station is providing an EQP, thereby increasing the opportunities for asynchronous systems to transmit but decreasing the available bandwidth of the synchronous system. When an interferer is detected, the duty cycle may be decreased. When an interferer is not detected, the duty cycle may be increased.

AEQP unit 310 may operate with regard to predefined reference levels for the duty cycle. Example predefined reference levels include, but are not limited to, a sharing duty cycle level, an intermediate duty cycle level, a maximum duty cycle level, and so forth. Adjustments to the duty cycle may be made at a step duty cycle amount. AEQP unit 310 may also operate with regard to one or more temporal thresholds. For example, a predetermined time period may be set that is to expire without detecting any interferers before the duty cycle is increased. Other example AEQP functionality that may be implemented by AEQP unit 310 is described herein below with particular reference to FIGS. 9 and 10.

In an example embodiment, LBT unit 312 can enable the base station to avoid transmitting over, and possibly interfering with, other users in a wireless environment, such as users in an asynchronous wireless system. LBT unit 312 can facilitate uncoordinated coexistence between a synchronous base station and any asynchronous systems or devices thereof that are in interference range of the coverage area of the synchronous base station. Prior to transmitting, LBT unit 312 listens in an attempt to detect a transmission from another system. If a transmission is detected, the base station refrains from (e.g., avoids, delays, etc.) transmitting for some predefined time period.

As mentioned above, LBT unit 312 first attempts to detect transmissions from other users before allowing transmission in the synchronous system. A transmission may be detected, by way of example but not limitation, when a detected energy level (e.g., noise level) exceeds a predetermined threshold, when an actual valid signal is detected, and so forth. In a synchronous system, the base station may refrain from transmitting for a time period equal to a DL subframe, for example. Alternatively, the base station may refrain from transmitting until the transmission(s) from the other user(s) cease and then begin transmitting to its subscriber stations—thus starting a new synchronous transmission cycle.

The minimum duration of each listening period may be set based on a channel bandwidth in which a synchronous system is operating. Other example LBT functionality that may be implemented by LBT unit 312 is described herein below with particular reference to FIG. 11A. Also, various LBT scenarios in which LBT unit 312 may operate are described herein below with particular reference to FIGS. 12A, 12B, 13A, 13B, and 14. Furthermore, LBT unit 312 may be used in conjunction with DMA unit 316.

In an example embodiment, DMA unit 316 implements a scheme to access a communications medium via a reservation approach. DMA unit 316 transmits a frame reservation signal at a frame reservation send time (FRST) prior to the start of a DL subframe of a targeted frame. The frame reservation signal requests or indicates to at least asynchronous devices that they should not transmit on the channel at a specified time. Generally, the wireless device attempts to seize the channel at the frame reservation send time prior to the start of the targeted DL subframe. Specifically, LBT unit 312 may perform an LBT procedure to ensure that no other transmission is detected and that the channel is available before the frame reservation signal is transmitted by FRS unit 316. The attempt to seize the channel therefore includes an LBT portion and a frame reservation signal portion.

DMA unit 316 may implement an adjustable channel-seizing scheme involving the transmission of a frame reservation signal. In accordance with an adjustable channel-seizing scheme, when a synchronous device fails to seize the channel for a DL subframe of a targeted frame, the length of the frame reservation send time is increased for each targeted frame until the channel is successfully seized. Other example DMA functionality that may be implemented by DMA unit 316 is described herein below with particular reference to FIGS. 16A, 16B, and 17.

As illustrated in FIG. 3B, the components of subscriber station 104 include a UCP unit 352, an interferer identifier unit 356, an EQP unit 358, an LBT unit 362, and at least one transceiving unit 364. Components 352-362 of subscriber station 104 may be embodied as software, firmware, hardware (including manual controls), fixed logic circuitry, some combination thereof, and so forth.

Transceiving unit 364 includes a transmitting unit 364(T) and/or a receiving unit 364(R). Transceiving unit 364 enables subscriber station 104 to communicate wirelessly via communication links 106. Transmitting unit 364(T) and receiving unit 364(R) may include one or more transmitters or receivers, respectively, and/or one or more transmitting chains or receiving chains. Having multiple (e.g., at least two) receiving chains and transmitting chains enables a subscriber station 104 to simultaneously engage in multiple wireless communications. Each transmitter and receiver may include one or more radios (not explicitly shown) that are dedicated or shared. Transceiving unit 364 may also be adapted for use with a wired communications medium.

In an example embodiment, UCP unit 352 implements a contention-based protocol in conjunction with one or more of interferer identifier unit 356, EQP unit 358, and LBT unit 362. UCP unit 352 coordinates those other units that are included in a given subscriber station implementation. Any of the units that are present may be activated singularly or in combination by UCP unit 352 of subscriber station 104. In one embodiment, UCP unit 352 always utilizes at least LBT unit 362, either alone or in conjunction with one or more of interferer identifier unit 356 and EQP unit 358.

Interferer identifier unit 356 may operate similarly to interferer identifier unit 306 (of base station 102 of FIG. 3A). Interferer identifier unit 356 may also operate responsive to an instruction received from the base station as part of a response to a measuring and reporting request. Other example interferer identification functionality that may be implemented by interferer identifier unit 356 is described herein below with particular reference to FIG. 5.

In an example embodiment, EQP unit 358 adheres to an EQP established by the base station in a synchronous wireless system. When both the base station and its subscriber stations implement an EQP, it can create a longer continuous quiet time to facilitate other systems having an opportunity to communicate in the same frequency band. The subscriber station adheres to an EQP having a duration established by the base station.

In operation, EQP unit 358 of the subscriber station receives an EQP IC from the base station that includes an indication of an EQP duration (e.g., in number of synchronous frames). EQP unit 358 causes the subscriber station to refrain from transmitting from a starting frame for a time period equal to the indicated EQP duration. The starting frame can be implicit (e.g., be the next frame) or can be indicated explicitly. If the EQP IC from the base station indicates that measurement and reporting is to be undertaken by the subscriber station for the EQP, then measurements of any discovered interferers and/or unidentified noise are taken by the subscriber station during the EQP. The measurements may then be reported to the base station after the EQP ends.

Other example EQP functionality that may be implemented by EQP unit 358 is described herein below with particular reference to FIG. 8B.

In an example embodiment, LBT unit 362 facilitates uncoordinated coexistence between a synchronous subscriber station and any asynchronous wireless devices that are in interference range. LBT unit 362 first listens in an attempt to detect a transmission and, if a transmission is detected, the subscriber station refrains from (e.g., avoids, delays, etc.) transmitting for some predefined time period.

Generally, LBT unit 362 of the subscriber station 104 may operate similarly to LBT unit 312 of base station 102 (of FIG. 3A). However, the listening time period of LBT unit 362 occurs prior to the UL subframe (e.g., between the DL and UL subframes). When LBT unit 362 detects a transmission, the subscriber station refrains from transmitting even during its allocated portion of the UL subframe. Other example LBT functionality that may be implemented by LBT unit 362 is described herein below with particular reference to FIG. 11B. Also, various LBT scenarios in which LBT unit 362 may operate are described herein below with particular reference to FIGS. 13A and 13B.

FIGS. 4, 5, 8A, 8B, 9, 10, 11A, and 11B are flow diagrams that illustrate example methods relating to embodiments for a contention-based protocol. Implementations of these flow diagrams may be realized, for example, as processor-executable instructions (e.g., as realized by software, firmware, hardware circuitry, etc.), manual controls, or any combination of the foregoing. The actions of these flow diagrams may be performed in many different environments and with a variety of wireless devices, including by a base station 102 and/or a subscriber station 104 (both of FIGS. 1, 2, 3A, and 3B). Example implementations for the flow diagrams that are described below also refer to other figures that are described elsewhere herein by way of explanation but not limitation. The order in which each of the methods is described is not intended to be construed as a limitation, and any number of the described blocks can be combined, augmented, rearranged, and/or omitted to implement a respective method, or an alternative method that is equivalent thereto.

Figure 4:
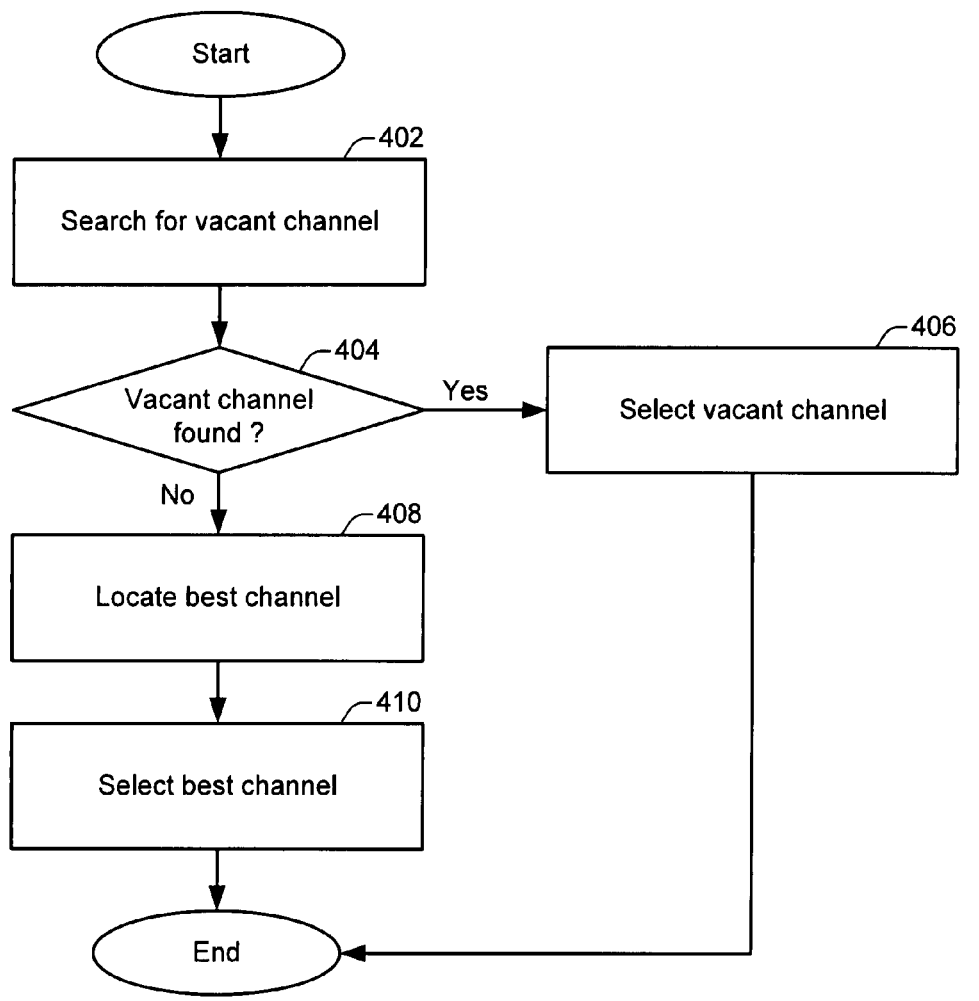
FIG. 4 is a flow diagram that illustrates an example method for dynamic channel selection (DCS).

FIG. 4 is a flow diagram 400 that illustrates an example method for dynamic channel selection (DCS). Flow diagram 400 includes five (5) blocks 402-410 for an example embodiment. The method of flow diagram 400 is usually performed by a base station 102, but it may also be performed by a subscriber station 104.

At block 402, a wireless device searches for a vacant channel. For example, a base station may scan each channel in a frequency band looking for a channel on which no transmissions are detected. At block 404, it is determined if a vacant channel is found. If so, then at block 406 the vacant channel is selected for communication.

If, on the other hand, no vacant channel is found (as determined at block 404), then at block 408 a best channel is located. Example characteristics defining a best channel are described herein above with regard to DCS unit 304 of FIG. 3A. At block 410, the best channel is selected for communication. It should be noted that a wireless device may consider any channel with a primary user (e.g., an SSU) as failing to be the best channel.

Figure 5:
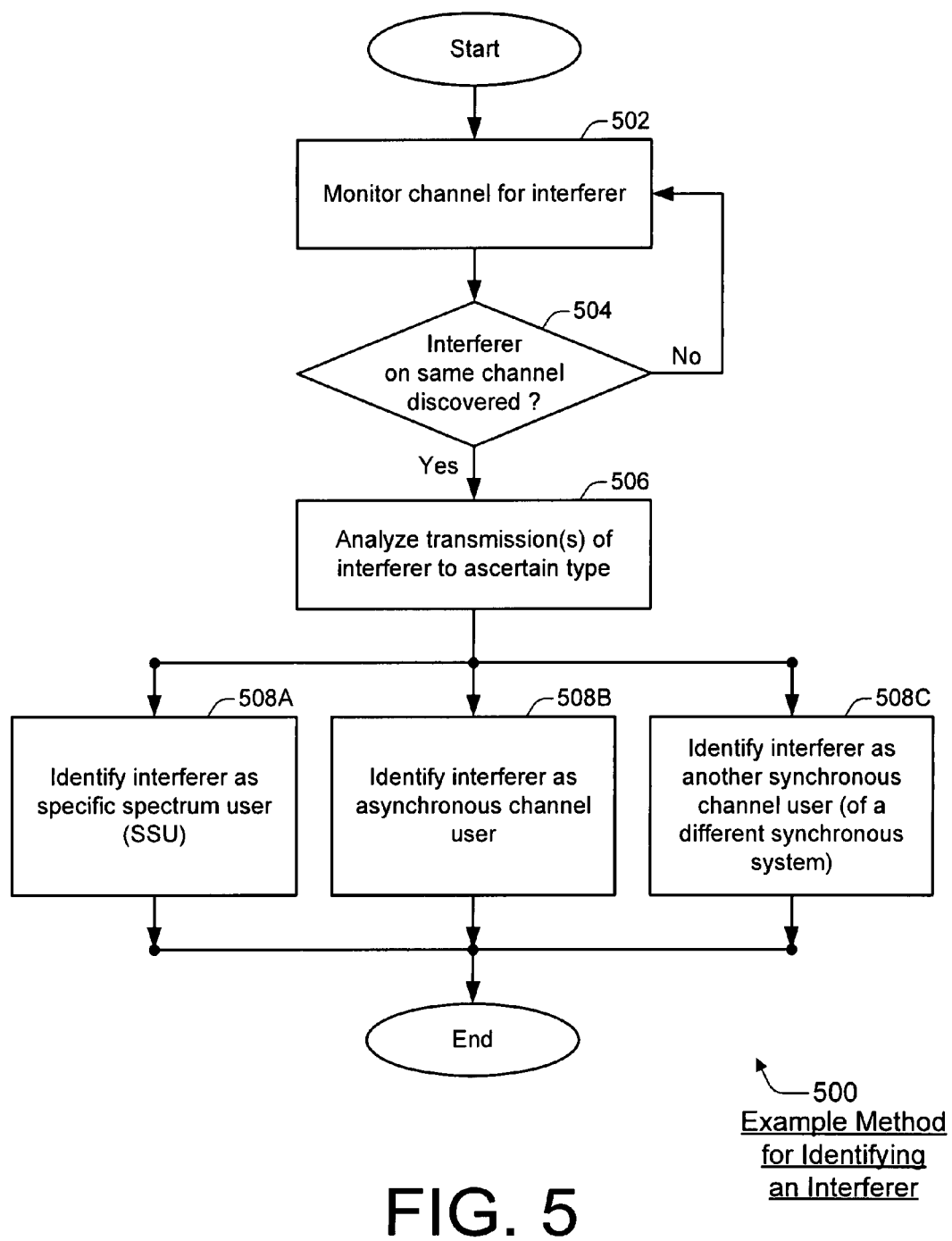
FIG. 5 is a flow diagram that illustrates an example method for identifying a type of interferer that is discovered on a channel.

FIG. 5 is a flow diagram 500 that illustrates an example method for identifying a type of interferer that is discovered on a channel. Flow diagram 500 includes six (6) blocks 502-506 and 508A-508C for an example embodiment. Flow diagram 500 may be performed by a base station 102 and/or its subscriber stations 104.

At block 502, a channel is monitored for interferers. In this context, an interferer may be a user of the channel that is not part of the monitoring device's wireless system. The channel can be monitored, for example, during listening-before-talking times, during EQPs, and so forth. At block 504, it is determined if an interferer is discovered on the same channel. If not, then monitoring continues at block 502 at appropriate times.

If, on the other hand, an interferer is discovered (as determined at block 504), the transmission(s) of the interferer are analyzed at block 506 to ascertain a type of the interferer. For example, the preamble and/or structure of the detected signal may be analyzed and compared to various wireless standard formats to determine the type of wireless system that the detected signal is operating in. Identifying a discovered interferer may also entail identifying a detected signal as noise. Based on the analysis of block 506, if possible, a type of the interferer is identified (or assumed) at blocks 508A-508C. At block 508A, the interferer is identified as a specific spectrum user (SSU). At block 508B, the interferer is identified as an asynchronous user of the channel. At block 508C, the interferer is identified as another synchronous user of the channel that is operating in conjunction with a different synchronous system.

The transmissions analysis of block 506 may further identify interferers by other types. For example, interferers may be identified by wireless standard type (e.g., IEEE 802.16, IEEE 802.11, etc.). Interferers may also be identified by wireless scheme (e.g., OFDM, TDMA, etc.). Moreover, interfering types may also be identified based on vendor, operator, and so forth.

FIG. 6A is a block diagram 600A illustrating an example of an extended quiet period (EQP) 604. Block diagram 600A includes multiple synchronous transmission frames 210 having a DL subframe 210(D) and an UL subframe 210(U). Each frame 210 has a frame duration 602. In an example embodiment, a length of EQP 604 is a multiple of frame duration 602. As illustrated, EQP 604 has a length of "e" frame durations, with "e" being some integer. During EQP 604, neither base station 102 nor its subscriber stations 104 are to transmit on the current channel.

FIG. 6B is a block diagram 600B illustrating an example of an EQP instruction communication (IC) 650. As illustrated, EQP IC 650 includes a duration 652, a report requested indication 654, and a starting frame indication 656. Alternatively, EQP IC 650 may include fewer or more than the illustrated parts. In an example embodiment, at least duration 652 is included. Duration 652 stipulates how many frames EQP 604 is to be (e.g., the value of "e" that EQP 604 is to have). EQP IC 650 may be realized, by way of example only, as an EQP information element that may be transmitted in a DL MAP from the base station or in an overhead message in the DL subframe.

Report requested indication 654, when present, indicates whether or not subscriber stations 104 are to send a report to base station 102 after taking measurements during EQP 604. The measurements may relate to any discovered interferers in the current channel (or other available channels), and the report may include an identification of type for one or more of the interferers. Report requested indication 654 may be a Boolean value, for example, or it may include one or more relatively complex requests from the base station for specific measurement and reporting.

Starting frame indication 656, when included, explicitly indicates a frame 210 at which EQP 604 is to start. Alternatively, the EQP starting frame may be implicitly indicated by default. For example, the EQP start frame may be implicitly set to the next frame after an EQP IC 650 is sent from a base station to its subscriber stations in a DL subframe 210(D), in the absence of an explicit starting frame indication 656 being included in an EQP IC 650.

FIGS. 7A and 7B are block diagrams illustrating example EQP scenarios 700A and 700B with map relevancies of a current frame and a future frame, respectively. EQP scenarios 700A and 700B illustrate frame f, frame f+1, and frame f+2+e. In between frames f+1 and f+2+e, there is a space equivalent to "e" frames for an EQP. The differences between EQP scenarios 700A and 700B, which are described below, illustrate the effects of different map relevancies.

Typically, each DL subframe of a synchronous frame includes an UL map and a DL map (not separately indicated in FIG. 7A). These maps inform subscriber stations of which portion(s) of the DL and/or the UL correspond to their communications. With FIG. 7A, EQP scenario 700A represents an UL map relevance of the current frame, as indicated by arrows 702. Hence, each UL map that is included as part of the DL subframe provides UL allocations for the UL subframe of the current frame.

In the examples of FIGS. 7A and 7B, EQP IC 650 (of FIG. 6B) is included as part of the DL map of the DL subframe. Alternatively, EQP IC 650 may be included as part of the UL map, the frame control header (FCH) block, or any other portion of the DL subframe. It may also be sent in a separate communication.

With FIG. 7A, as indicated at 704, the DL map at frame f+1 indicates the EQP start frame and duration. The EQP start frame is the next frame in this example. The integer "e" is the EQP duration. After the "e" frames of the EQP, frame f+2+e is communicated. Because the UL map relevance is the current frame, the UL map transmitted in the DL subframe of frame f+2+e corresponds to the UL subframe of frame f+2+e.

With FIG. 7B, EQP scenario 700B represents an UL map relevance of a future or subsequent frame, as indicated by arrows 752. Although any future frame may be referenced, this example represents a "standard" (e.g., non-EQP) UL map relevance of one frame (frame+1). Hence, each UL map that is included as part of a DL subframe provides UL allocations for an UL subframe of the next succeeding (+1) frame. As indicated at 754, the DL map at frame f+1 indicates the EQP start frame and EQP duration. After the "e" frames of the EQP, frame f+2+e is communicated.

Because the UL map relevance is the next succeeding frame, the UL map transmitted in the DL subframe of frame f+1 corresponds to the UL subframe of frame f+2+e. Although the future-frame UL map relevance scenario adds some complexity, subscriber stations can adhere to EQPs in scenarios with map relevancies of the current frame or a future frame. Thus, when the UL map relevance is the next frame, the UL map that is transmitted in the last DL subframe before an EQP describes the allocations for the first UL subframe after the EQP.

Figure 8A:
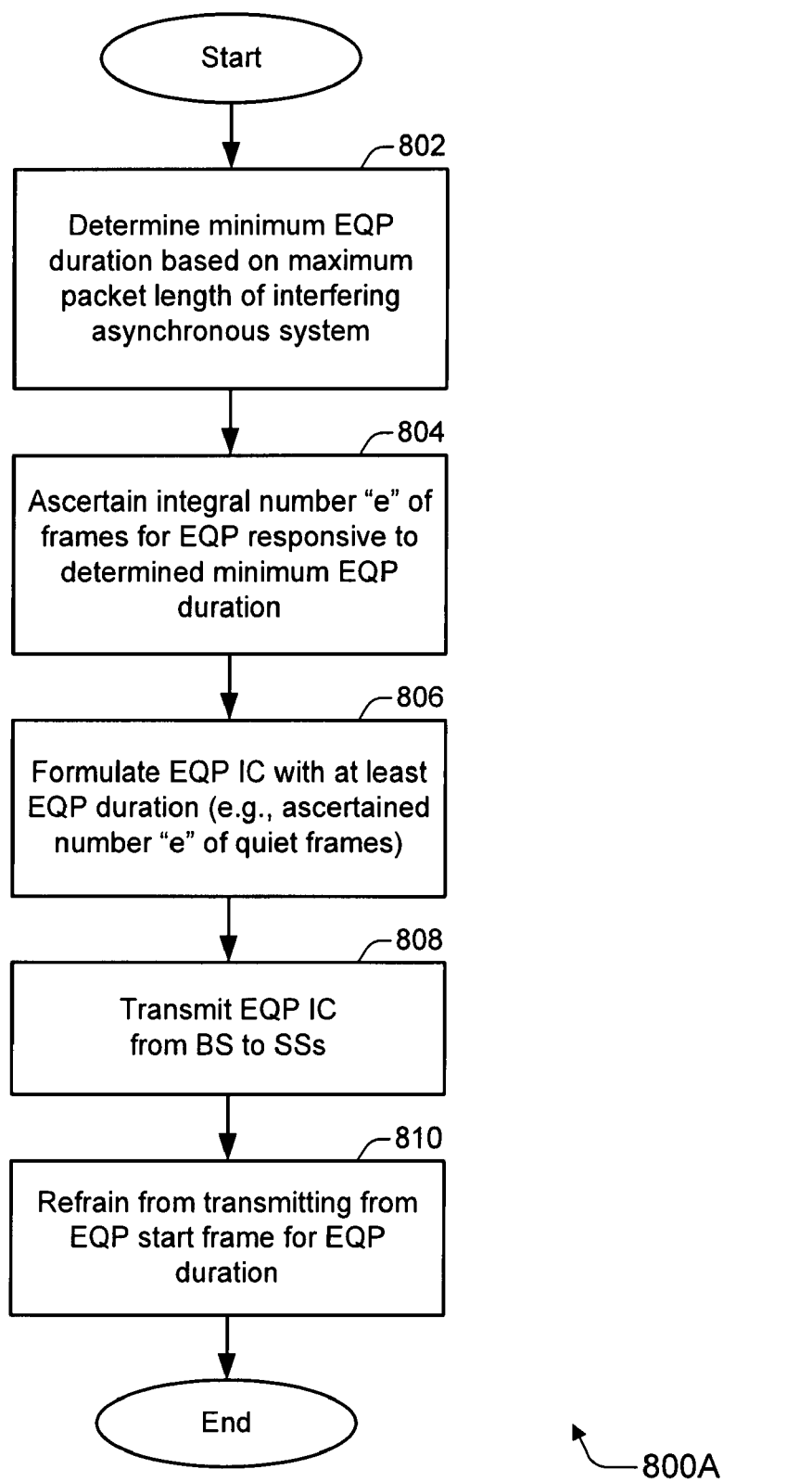
FIG. 8A is a flow diagram that illustrates an example method for a base station that is establishing an EQP.

FIG. 8A is a flow diagram 800A that illustrates an example method for a base station that is establishing an EQP. Flow diagram 800A includes five (5) blocks 802-810 for an example embodiment of establishing an EQP. Flow diagram 800A is typically performed by a base station 102, but it may be performed by other wireless devices if wireless system control is granted to another wireless device.

At block 802, a minimum EQP duration is determined based on a maximum packet length of an interfering asynchronous system. For example, when an interferer is identified as being of a particular type of asynchronous wireless system, the maximum allowed packet for such an asynchronous system may be used as the basis for determining the minimum EQP duration. In an example embodiment, the minimum EQP duration is set to equal or exceed the maximum packet length of the interfering system so as to provide it with sufficient time to transmit such a maximum length packet.

The maximum packet length may be determined by the maximum length of a PHY protocol data unit (PDU) of the interfering asynchronous system. The PHY PDU is usually dependent on the channel bandwidth. By way of example only, some maximum packet length durations for given channel bandwidths for particular example embodiments of an interfering IEEE 802.11 system are: 3.65 ms for a 20 MHz channel, 7.3 ms for a 10 MHz channel, 14.6 ms for a 5 MHz channel, and so forth. In 802.11j and 802.11y embodiments, the maximum burst duration is 4 ms.

At block 804, an integral number "e" of frames for the EQP are ascertained responsive to the determined minimum EQP duration. For example, the least number "e" of frames, which have a given frame duration for the synchronous system, to equal or exceed the determined minimum EQP duration may be ascertained.

At block 806, an EQP IC with at least the EQP duration (e.g, the ascertained number "e" of quiet frames) is formulated. For example, an EQP IC 650 having at least a duration part 652 may be formulated. The EQP duration of duration part 652 may be stipulated as an integer number "e" of frames. Alternatively, the EQP duration of duration part 652 may be stipulated as a period of time. EQP IC 650 may also be formulated to include a report requested indication 654 and/or a starting frame indication 656.

At block 808, the EQP IC is transmitted from the base station to one or more subscriber stations. For example, EQP IC 650 may be transmitted from base station 102 to one or more subscriber stations 104 alone, as part of a DL subframe, as part of another communication, and so forth. At block 810, the base station refrains from transmitting starting from the EQP start frame and continues to refrain from transmitting for the EQP duration. For example, base station 102 may refrain from transmitting from the EQP start frame through the "e" frames of the EQP duration. As noted above, the EQP start frame may be implicit or may be explicitly provided.

Figure 8B:
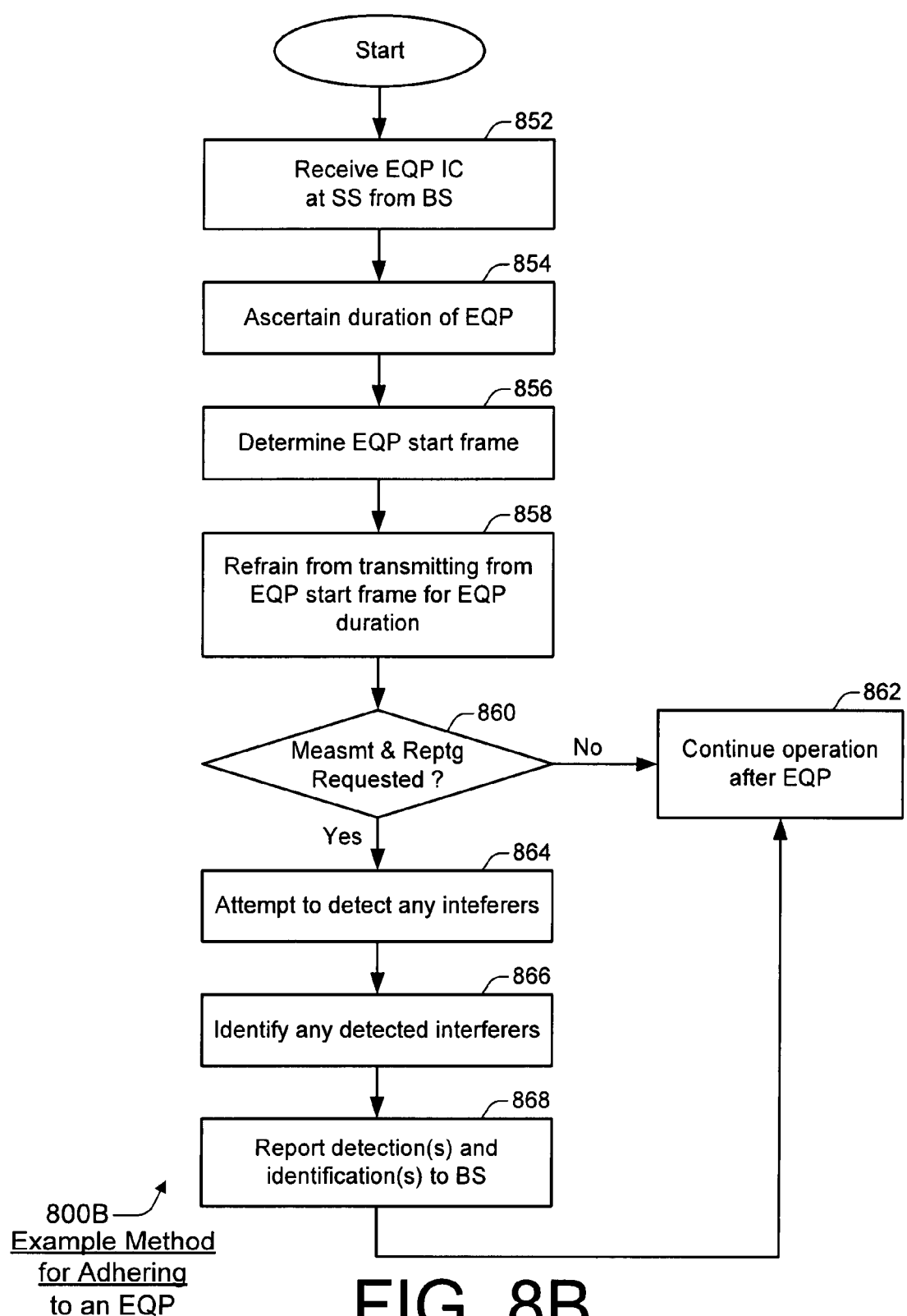
FIG. 8B is a flow diagram that illustrates an example method for a subscriber station that is adhering to an EQP.

FIG. 8B is a flow diagram 800B that illustrates an example method for a subscriber station that is adhering to an EQP. Flow diagram 800B includes nine (9) blocks 852-868 for an example embodiment. Flow diagram 800B is typically performed by one or more subscriber stations 104, but it may be performed by other wireless devices, for example if wireless system roles are exchanged between wireless devices.

At block 852, an EQP IC is received at a subscriber station from a base station. For example, a subscriber station 104 may receive an EQP IC 650 from base station 102. At block 854, a duration of the EQP is ascertained. For example, an EQP duration may be extracted from a duration part 652 of EQP IC 650.

At block 856, an EQP start frame is determined. For example, an EQP start frame for an EQP 604 may be determined based on a predefined default frame (e.g., the next frame, the second successive frame, etc.) or by extracting an explicitly indicated frame (e.g., from a starting frame indication 656). At block 858, the subscriber station refrains from transmitting during the EQP from the EQP start frame for the EQP duration. For example, subscriber station 104 may refrain from transmitting during EQP 604 from a start frame for a total of "e" frames.

At block 860, it is determined if measurement and reporting is requested. For example, subscriber station 104 may determine if its base station 102 has requested that a report be returned to it by inspecting a report requested indication 654 of EPQ IC 650. If not, then at block 862 the subscriber station continues normal operation at the conclusion of the EQP. For example, subscriber station 104 may continue normal operation in accordance with any given UL map relevance 702/752 at frame f+2+e.

If, on the other hand, a report is requested (as determined at block 860) then the subscriber station attempts to detect any interferers at block 864. For example, subscriber station 104 may monitor the current channel (and/or any other available channels) to attempt to detect transmission(s) from users that are not part of its wireless system. At block 866, the subscriber station attempts to identify a type of any detected interferers. For example, subscriber station 104 may attempt to identify by type any detected interferers in accordance with the flow diagram 500 (of FIG. 5).

At block 868, the subscriber station reports any interferer detection(s) and type identification(s) thereof to the base station. The report may be formulated in any manner and transmitted to the base station using any standard or specialized protocols. The desire for bandwidth to transmit a report may be signaled through, e.g., any of the standard methods for signaling a need for UL bandwidth. Before, during, or after when the report is transmitted to the base station (at block 868), the subscriber station at block 862 continues normal operation after the EQP is concluded.

By way of example only, a subscriber station that is operating in accordance with an IEEE 802.16 standard may create a basic report in response to a REP-REQ communication from the base station. The subscriber station then transmits a corresponding REP-RSP message if a measurement by the subscriber station detected activity above the threshold for the frequency band of operation, which indicates that there is another channel occupant.

Figure 9:
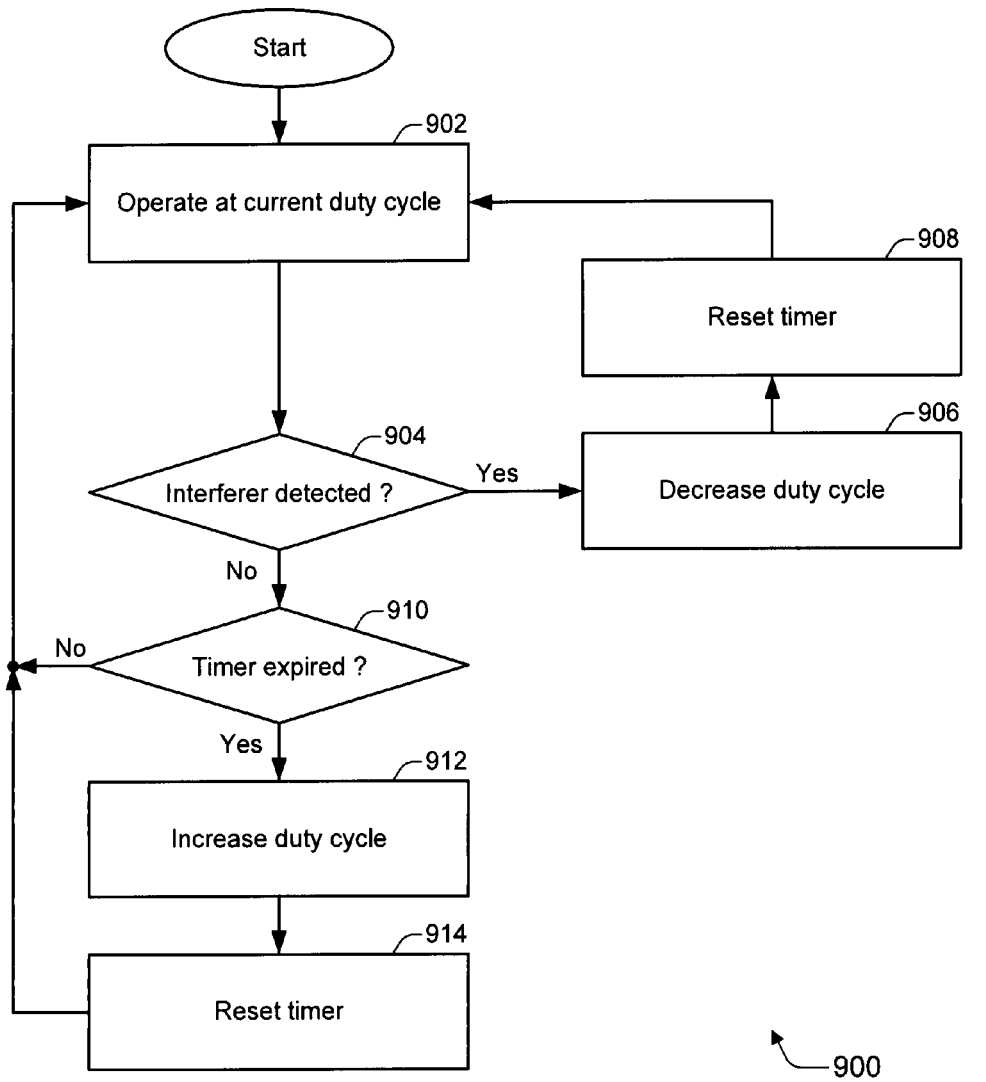
FIG. 9 is a flow diagram that illustrates an example general method for implementing an adaptive EQP.

FIG. 9 is a flow diagram 900 that illustrates an example general method for implementing an adaptive EQP. Flow diagram 900 includes seven (7) blocks 902-914 for an example embodiment. Flow diagram 900 is typically performed by a base station 102, but it may be performed by other wireless devices if wireless system control is granted to another wireless device.

In an example adaptive EQP embodiment, base stations operate at some duty cycle with respect to providing EQPs in their wireless system. The duty cycle represents and sets an operational ratio at which an EQP is provided. By way of example only, duty cycles are measured over some period of time (e.g., a period of half a second, of 1 second, of 2 seconds, of 10 seconds, etc.). In one embodiment, EQPs are "produced" during off cycles, but they are not produced during on cycles such that on cycles involve synchronous transmissions. Of course, an alternative embodiment of the invention may be implemented which is the reverse of the above scheme so that EQPs are produced during on cycles, but EQPs are not produced during off cycles.

The operational ratio of the duty cycle can be achieved in a number of ways. Examples include, but are not limited to, taking a percentage of frames on and a percentage of frames off, being on in a certain percentage of "n" frames, being on at certain percentage probability each frame, and so forth. For instance, a 50% duty cycle can be achieved: by being on every other frame, by taking n frames on and n frames off, by being on in n/2 of n frames, and so forth. If different base stations use different approaches to achieving duty cycle levels, the likelihood of their eventually detecting each other or a subscriber station associated with the other base station increases.

When a base station initially starts, it may begin operating at any duty cycle, including a predefined duty cycle reference level (e.g., shared, intermediate, maximum, etc.). For example, it may begin operating at a sharing duty cycle level to be cautious. Alternatively, especially if no other channel users are initially discovered, the base station may begin operating at an intermediate duty cycle level or even at or near a maximum duty cycle level. At the "start" of flow diagram 900, a wireless device is currently operating at a duty cycle level that enables channel sharing (e.g., at least below a duty cycle level of being operationally on 100% of the time).

At block 902, a wireless device is operating at a current duty cycle. For example, a base station may be currently operating at a duty cycle level that enables at least some channel sharing. At block 904, it is determined if an interferer is detected within the wireless system. If so, then the current duty cycle is decreased at block 906, unless the current duty cycle is already at a minimum acceptable duty cycle. At block 908, a timer is reset because an interferer has been detected. Example embodiments for the timer are described below. After the timer is reset at block 908, flow diagram 900 continues at block 902 such that the wireless device is currently operating at the decreased duty cycle.

If, on the other hand, no interferer is detected (at block 904), then at block 910 it is determined if a timer has expired. For example, the base station may determine whether or not a predetermined time period has expired. The time period is instituted so that the operational duty cycle is not increased too quickly when an interferer is not detected. For instance, if after a prolonged period (which may be band specific in duration) the base station and its associated subscriber stations have not detected other users in the band through measurement and reporting during EQPs coupled with measurement and reporting as performed for DCS, then the base station may be permitted to increase its duty cycle by some amount.

If the timer has not expired (as determined at block 910), then the method of flow diagram 900 continues at block 902 with no change to the current duty cycle. If, on the other hand, the timer has expired without detecting an interferer, then at block 912 the current duty cycle is increased, unless the current duty cycle is already at a maximum acceptable duty cycle. At block 914, the timer is reset. For example, the time may be reset to the predetermined time period associated with being permitted to increase the duty cycle. Example predetermined time period values for this timer could be 10 seconds, 30 seconds, 1 minute, etc. However, other values may alternatively be used. After the timer is reset at block 914, the method of flow diagram 900 continues at block 902 such that the wireless device is currently operating at the increased duty cycle.

Predefined duty cycle reference levels that inhibit further increases or decreases to the current duty cycle may be adopted. Example predefined duty cycle reference levels (e.g., shared, intermediate, maximum levels) are described herein below with particular reference to FIG. 10. Example default reference levels and step increasing/decreasing amounts are also described.

Figure 10:
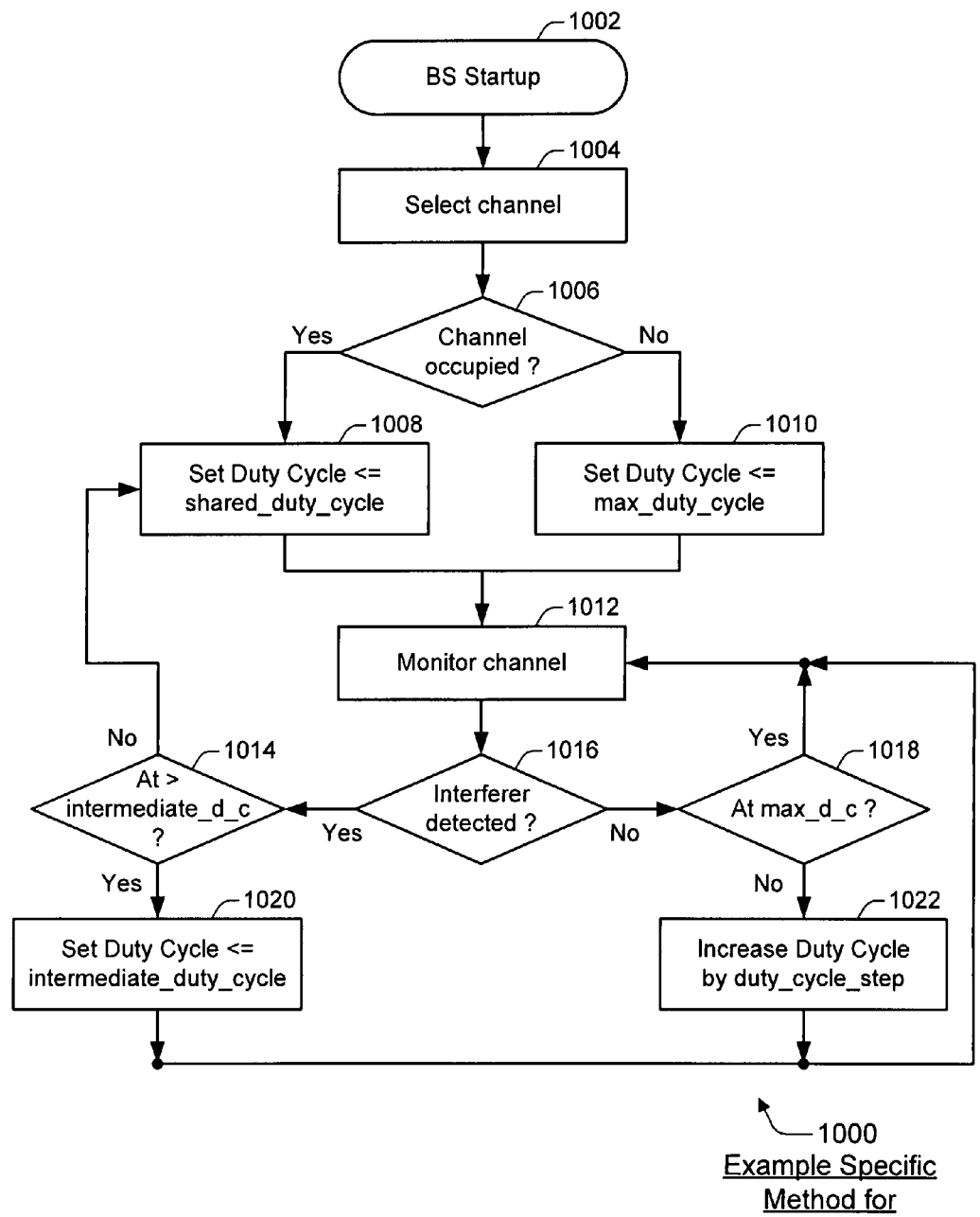
FIG. 10 is a flow diagram that illustrates an example specific method for implementing an adaptive EQP.

FIG. 10 is a flow diagram 1000 that illustrates an example specific method for implementing an adaptive EQP. Flow diagram 1000 includes eleven (11) blocks 1002-1022 for an example embodiment. Flow diagram 1000 is typically performed by a base station 102, but it may be performed by other wireless devices if wireless system control is granted to another wireless device.

At block 1002, the base station starts up. At block 1004, a channel is selected for operation. For example, a base station may implement a DCS procedure to select a channel.

At block 1006, it is determined if the channel is occupied by another user of a different wireless system. If so, then at block 1008 the current duty cycle is set to be less than or equal to a shared duty cycle level. If not, then at block 1010 the current duty cycle is set to be less than or equal to a maximum duty cycle level.

At block 1012, the selected channel is monitored for interferers. For example, the channel may be monitored for detectable transmissions from users that are not participants of the wireless system of the base station. The monitoring may be performed by the base station and/or its associated subscriber stations (e.g., during EQPs, with DCS procedures, etc.).

At block 1016, it is determined if an interferer is detected. If so, then at block 1014 it is determined if the current duty cycle is greater than an intermediate duty cycle level. If the current duty cycle is not determined to be greater than the intermediate duty cycle level, then at block 1008 the current duty cycle is set (e.g., reduced) to the shared duty cycle level. If, on the other hand, the current duty cycle is determined to be greater than the intermediate duty cycle level, then at block 1020 the current duty cycle is set (i.e., reduced) to the intermediate duty cycle level. The method of flow diagram 1000 then continues at block 1012 with additional channel monitoring. Alternatively, instead of setting the current duty cycle to a predefined duty cycle reference level, it may be reduced by some step amount or amounts (e.g., after block 1014).

If, on the other hand, no interferer is detected (as determined at block 1016), then at block 1018 it is determined if the current duty cycle is at a maximum duty cycle level. If the current duty cycle is not determined to be at the maximum duty cycle level, then at block 1022 the current duty cycle is increased by a duty cycle step amount. After block 1022, the method of flow diagram 1000 continues at block 1012 with additional channel monitoring. If the current duty cycle is determined to already be at the maximum duty cycle level (at block 1018), then channel monitoring continues at block 1012 with no change to the duty cycle.

Example values for the various predefined duty cycle reference levels are: the sharing duty cycle level is 50%, the intermediate duty cycle level is 75%, and the maximum duty cycle level is 90%, although other sets of values may be used. An example value for the step duty cycle amount is 10%, although other values may alternatively be used. Moreover, additional duty cycle levels may be implemented, such as when a synchronous system is sharing a channel with another synchronous system as well as an asynchronous system. Additionally, different values may be used for the duty cycle step amount when increasing the duty cycle as compared to when decreasing it.

Figure 11A:
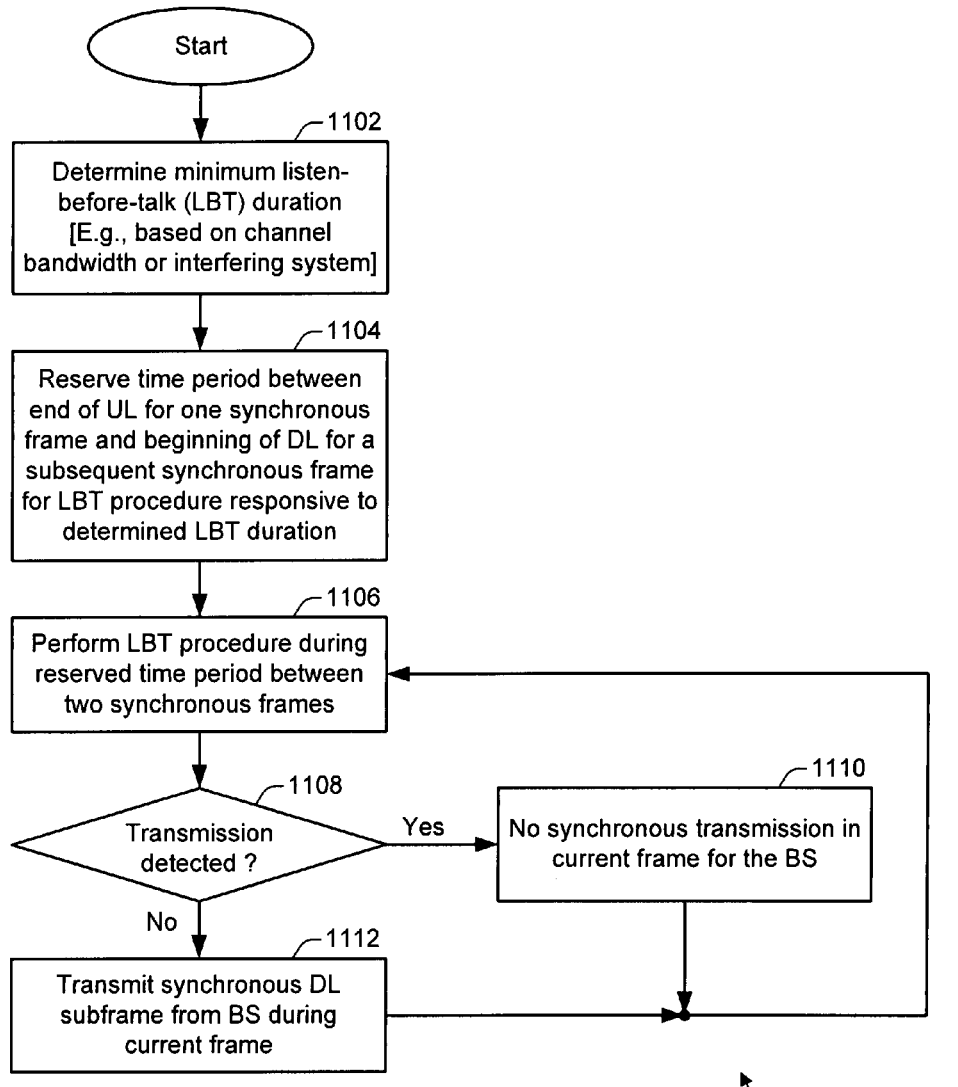
FIG. 11A is a flow diagram that illustrates an example method for implementing a listen-before-talk (LBT) procedure at a base station.

FIG. 11A is a flow diagram 1100A that illustrates an example method for implementing a listen-before-talk (LBT) procedure at a base station. Flow diagram 1100A includes six (6) blocks 1102-1112 for an example embodiment. Flow diagram 1100A is typically performed by a base station 102, but it may be performed by other wireless devices if wireless system control is granted to another wireless device.

At block 1102, a minimum LBT duration is determined. For example, a minimum LBT duration may be determined based on channel bandwidth or on a probable type of interfering asynchronous wireless system. Examples of minimum LBT durations were described above with regard to FIG. 8A.

At block 1104, a time period is reserved between the end of an UL subframe for one synchronous frame and the beginning of a DL subframe for a subsequent synchronous frame for performing an LBT procedure responsive to the determined LBT duration. For example, the base station may reserve a time period at least equal to (and possibly greater than) the determined minimum LBT duration for listening for other transmissions between successive synchronous frames.

At block 1106, the LBT procedure is performed during the reserved time period between two successive synchronous frames. For example, a base station may listen for transmissions from other users during the reserved time period. At block 1108, it is determined if a transmission is detected. For example, the base station may determine if any transmissions exceed an energy detection threshold, if any valid signals are detected, and so forth.

If a transmission is detected, then at block 1110 no synchronous transmission is made by the base station in the current frame. If, on the other hand, no transmission is detected during the LBT period (as determined at block 1108), then at block 1112 the base station does transmit for the DL subframe during the current synchronous frame. After block 1110 or 1112, the method of flow diagram 1100A continues at block 1106 by performing another LBT procedure at the next base station LBT time period between successive synchronous frames.

Figure 11B:
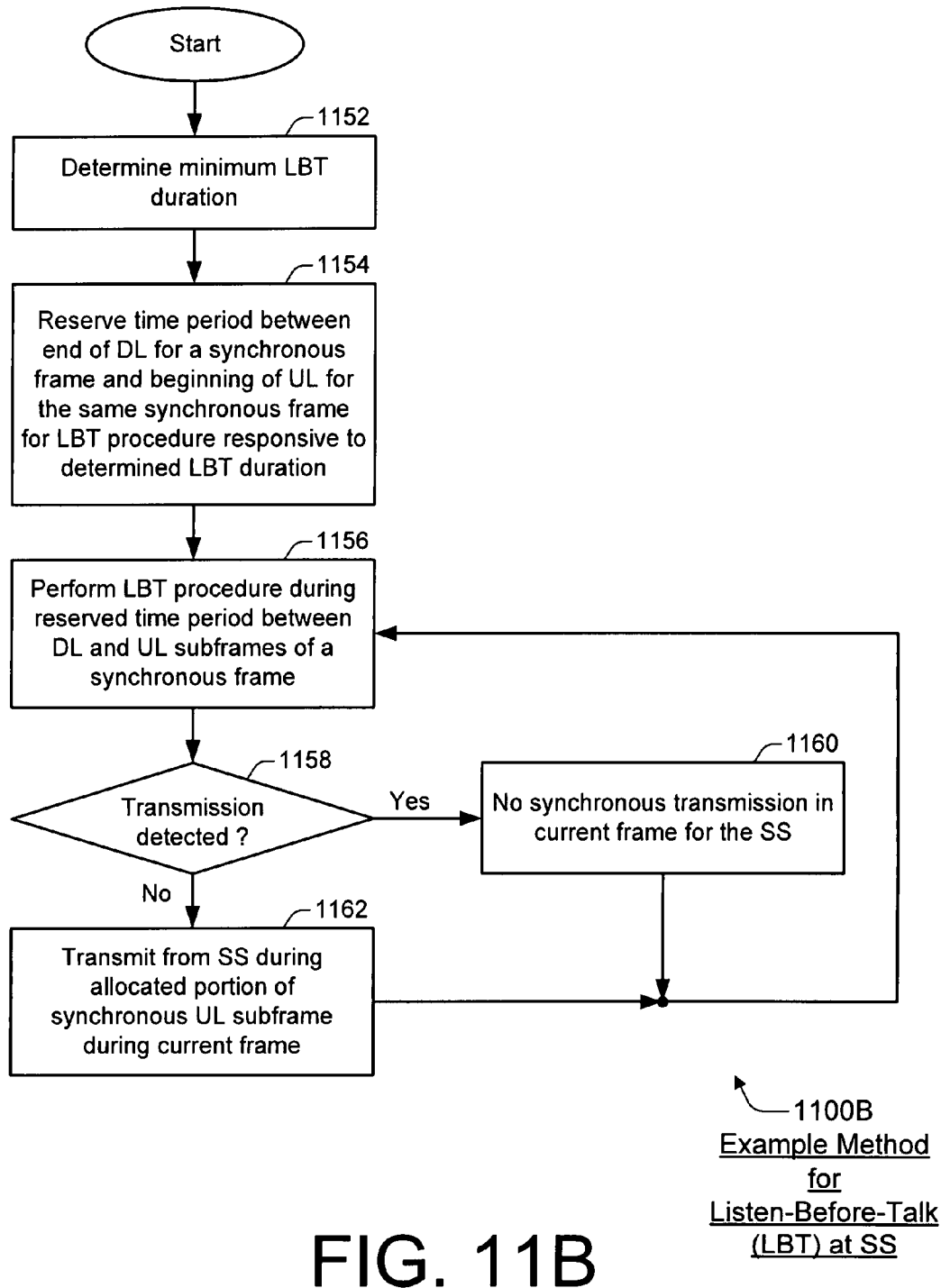
FIG. 11B is a flow diagram that illustrates an example method for implementing an LBT procedure at a subscriber station.

FIG. 11B is a flow diagram 1100B that illustrates an example method for implementing an LBT procedure at a subscriber station. Flow diagram 1100B includes six (6) blocks 1152-1162 for an example embodiment. Flow diagram 1100B is typically performed by one or more subscriber stations 104, but it may be performed by other wireless devices if wireless system roles are exchanged between wireless devices.

At block 1152, a minimum LBT duration is determined. For example, the subscriber station may independently determine a minimum LBT duration, or it may determine a minimum LBT responsive to a communication from the base station, which may provide the minimum LBT duration that is to be used throughout its wireless system.

At block 1154, a time period is reserved responsive to the determined LBT duration between the end of a DL subframe and the beginning of an UL subframe for a given synchronous frame to perform an LBT procedure. The base station may participate in this reservation aspect for its wireless system.

At block 1156, the LBT procedure is performed during the reserved time period between DL and UL subframes of a synchronous frame. For example, the subscriber station may listen in an attempt to detect transmissions from other users during the reserved time period. At block 1158, it is determined if a transmission is detected. For example, the subscriber station may determine if any transmissions exceed an energy detection threshold, if any valid signals are detected, and so forth.

If a transmission is detected, then at block 1160 the detecting subscriber station forgoes any synchronous transmission in the current frame. However, other non-detecting subscriber stations may still transmit during their allocated portions of the UL subframe in the current frame. If, on the other hand, no transmission is detected during the LBT period (as determined at block 1158), then at block 1162 the subscriber station does transmit during its allocated portion(s) of the UL subframe during the current synchronous frame. After block 1160 or 1162, the method of flow diagram 1100B continues at block 1156 by performing another LBT procedure at the next subscriber station LBT time period prior to an UL subframe of a synchronous frame.

Figure 12A:
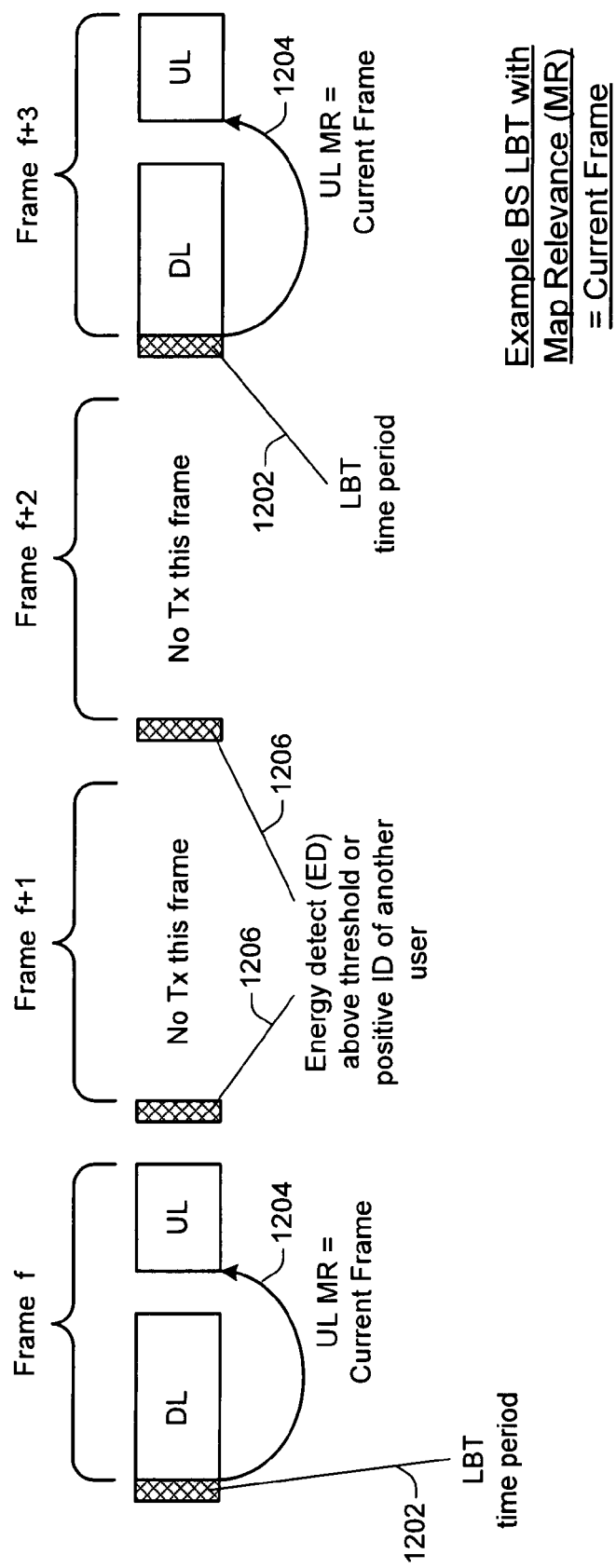
FIGS. 12A and 12B are block diagrams illustrating example LBT scenarios for a base station with map relevancies of a current frame and a future frame, respectively.
Figure 12B:
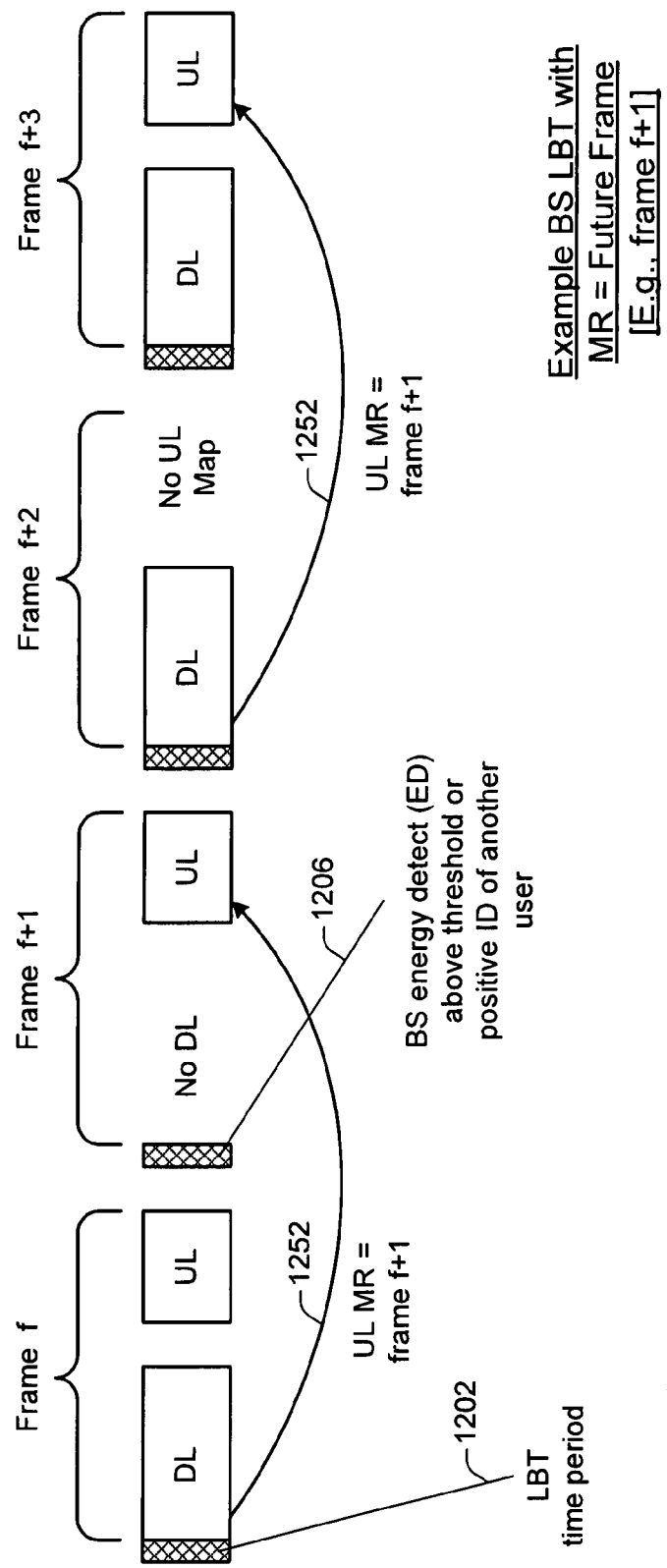

FIGS. 12A and 12B are block diagrams illustrating example LBT scenarios 1200A and 1200B for a base station with map relevancies of a current frame and a future frame, respectively. Each of LBT scenarios 1200A and 1200B illustrate four frames: frame f, frame f+1, frame f+2, and frame f+3. There are temporal durations reserved for a DL subframe and an UL subframe in each frame.

Prior to each frame, such as between an UL subframe of one frame and a DL subframe of a succeeding frame, there is a reserved LBT time period 1202. For one or two LBT time periods in scenarios 1200A and 1200B, at least one transmission from an interferer is detected. This is indicated at 1206 by text describing an energy detect (ED) above a threshold and/or a positive identification (ID) of another user.

For FIG. 12A, LBT scenario 1200A represents a map relevance of a current frame. Arrows 1204 indicate that the UL map relevance is for the current frame. With frame f and frame f+3, there are no detected transmissions at LBT time periods 1202. Hence, a DL subframe having an UL map is transmitted. The subscriber stations can therefore transmit in the UL subframes of frames f and f+3. With frame f+1 and frame f+2, at least one transmission is detected by the base station at 1206. Hence, no DL subframe is transmitted. Without an UL map from a DL subframe, the subscriber stations cannot transmit during the UL subframe portions of frames f+1 and f+2. Thus, there are no transmissions in frames f+1 and f+2.

For FIG. 12B, LBT scenario 1200B represents a map relevance of a future frame, such as frame+1. Arrows 1252 indicate that the UL map relevance is for the frame+1. Thus, the UL map transmitted in the DL subframe of frame f corresponds to the UL subframe of frame f+1, and the UL map transmitted in the DL subframe of frame f+2 corresponds to the UL subframe of frame f+3. A DL subframe is transmitted for frame f, so an UL subframe can be transmitted by subscriber stations in frame f+1. At 1206, at least one transmission is detected during the LBT time period prior to the DL subframe of frame f+1. Consequently, no DL subframe, and hence no UL map, is transmitted during frame f+1. As a result, no UL subframe is transmitted by the subscribers in frame f+2 because no UL map was previously provided in frame f+1.

Figure 13A:
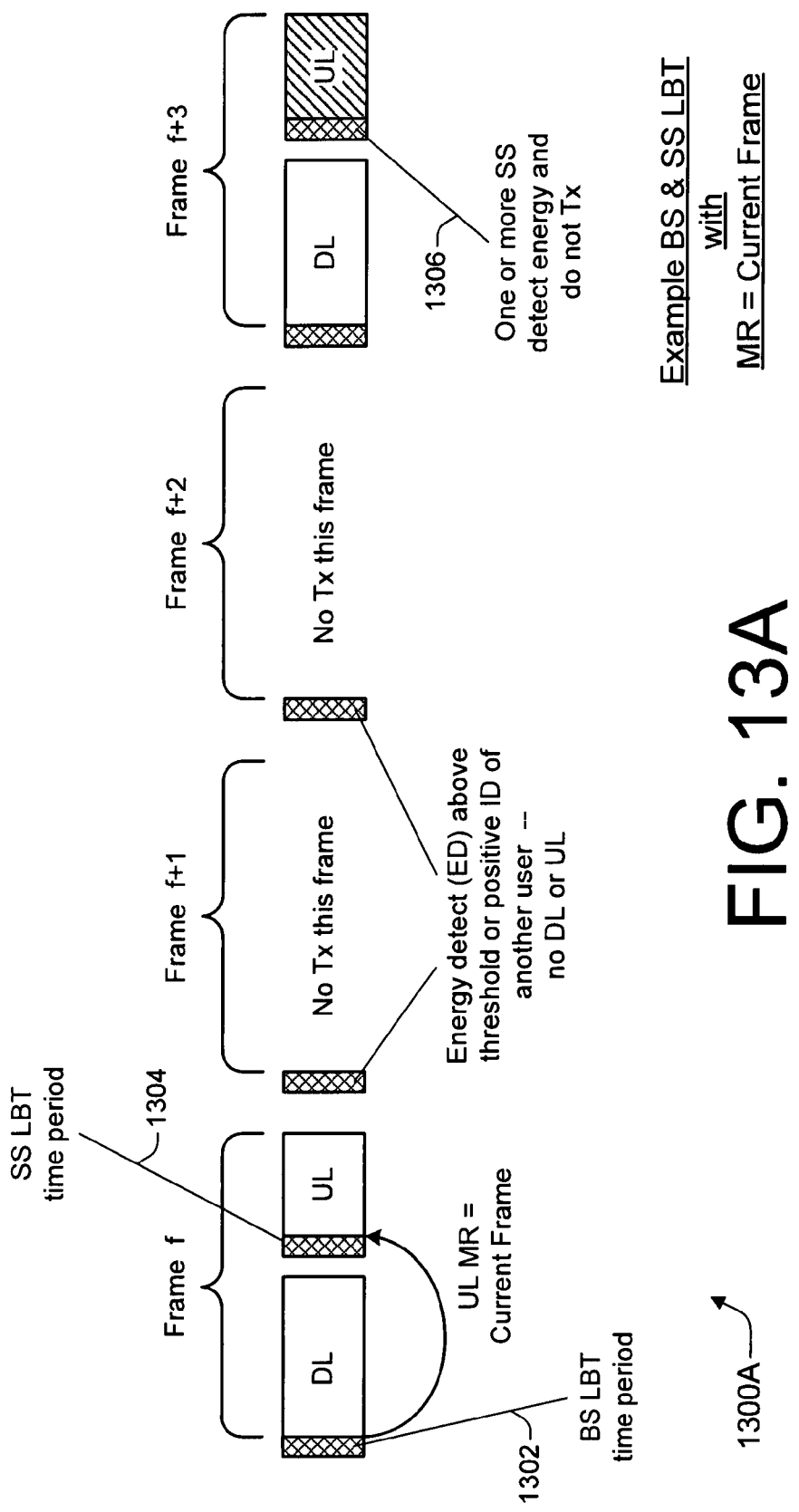
FIGS. 13A and 13B are block diagrams illustrating example LBT scenarios for a base station and for subscriber stations with map relevancies of a current frame and a future frame, respectively.
Figure 13B:
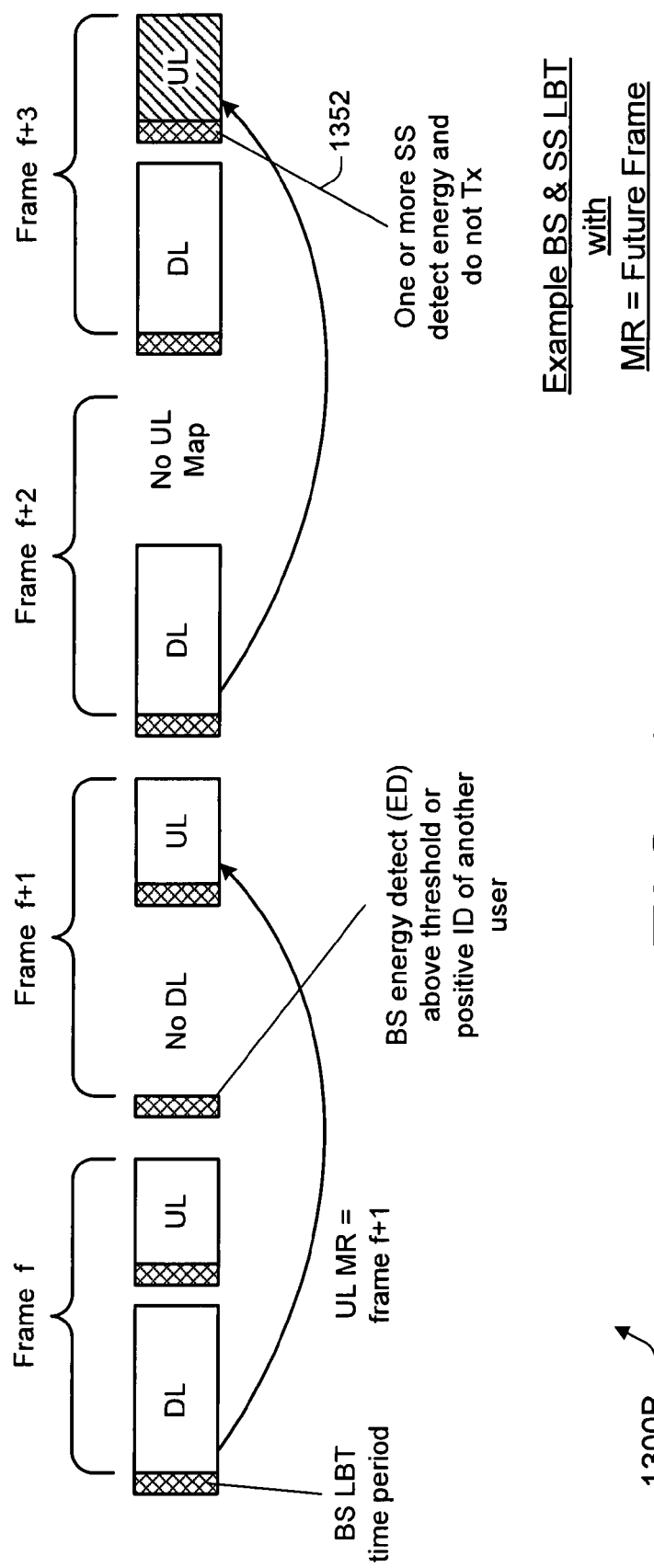

FIGS. 13A and 13B are block diagrams illustrating example LBT scenarios 1300A and 1300B for a base station and for subscriber stations with map relevancies of a current frame and a future frame, respectively. Each of LBT scenarios 1300A and 1300B illustrate four frames: frame f, frame f+1, frame f+2, and frame f+3. There are temporal durations reserved for a DL subframe and an UL subframe in each frame.

In contrast to scenarios 1200A and 1200B (of FIGS. 12A and 12B), both the base station and the subscriber stations are performing LBT procedures during respective reserved LBT time periods in scenarios 1300A and 1300B. Prior to each frame, such as between an UL subframe of one frame and a DL subframe of a succeeding frame, there is a reserved BS LBT time period 1302. Additionally, there is a reserved SS LBT time period 1304 prior to each UL subframe, such as between the DL subframe and the UL subframe of each synchronous frame.

For FIG. 13A, LBT scenario 1300A represents a map relevance of a current frame. With frame f, neither the base station nor any subscriber stations detect transmissions during their respective reserved LBT time periods 1302 and 1304. With frame f+1 and frame f+2, at least one transmission is detected by the base station; consequently, no DL subframe is transmitted. Without an UL map from a DL subframe, the subscriber stations cannot transmit during the UL subframe portions of frames f+1 and f+2. There are no transmissions by the synchronous wireless system during frames f+1 and f+2.

With frame f+3, the base station transmits a DL subframe with an UL map. However, one or more subscriber stations do detect at least one transmission at 1306 during their SS LBT time period. As a result, these one or more subscriber stations do not transmit during the UL subframe of frame f+3. Nevertheless, other non-detecting subscriber stations may transmit during their allocated portion(s) of the UL subframe of frame f+3, as indicated by the diagonal line pattern.

For FIG. 13B, LBT scenario 1300B represents a map relevance of a future frame, such as frame f+1. With frame f, neither the base station nor any subscriber stations detect transmissions during their respective reserved LBT time periods. Both a DL subframe and an UL subframe are transmitted during frame f. With frame f+1, the base station detects a transmission, so there is no DL subframe transmitted. Because the UL map for the UL subframe of frame f+1 was transmitted during the DL subframe of frame f, there is an UL subframe transmitted by the subscriber stations during frame f+1.

With frame f+2, the base station does not detect any transmissions, so there is a DL subframe that provides an UL map for the UL subframe of frame f+3. Because there was no UL map transmitted during the DL subframe of frame f+1, the subscriber stations cannot transmit an UL subframe in frame f+2. With frame f+3, the base station transmits a DL subframe after failing to detect any transmissions during its reserved BS LBT time period. Because the UL map for the UL subframe of frame f+3 was transmitted during the DL subframe of frame f+2, there is an UL subframe transmitted by at least some of the subscriber stations during frame f+3. However, one or more subscriber stations do detect at least one transmission at 1352 during their SS LBT time period. As a result, these one or more subscriber stations do not transmit during the UL subframe of frame f+3. Nevertheless, other non-detecting subscriber stations may transmit during their allocated portion(s) of the UL subframe of frame f+3, as indicated by the diagonal line pattern FIG. 13B is described above in the context of respective subscriber stations that implement respective LBT procedures prior to their respective uplink transmissions in each UL subframe. However, for other example embodiments subscriber stations may omit performing their own LBT procedures prior to transmitting at their allocated portions of the UL subframe. (For example, when a base station transmits a frame reservation signal between the DL and UL subframes of a synchronous frame, the associated subscriber stations may omit performing LBT procedures. An example of a base station transmission of a frame reservation signal during an inter-subframe gap to reserve the UL subframe on behalf of its associated subscriber stations is described herein below with particular reference to FIG. 15B.) When a subscriber station is not performing its own LBT procedure for each UL subframe, the scenario 1300B that is illustrated in FIG. 13B may be modified as explained below. It should be noted that this modification is also applicable to other future frame map relevancy scenarios in which a base station might not transmit a downlink subframe besides those scenarios that are related to base station LBT procedures (e.g., EQP scenarios, etc.).

In an example embodiment of such a modification, a subscriber station refrains from transmitting during each UL subframe of a synchronous frame whenever the base station does not first transmit a corresponding DL subframe having a current UL map for the current synchronous frame. The subscriber station refrains from transmitting because the base station has likely not transmitted a frame reservation signal to reserve the channel for its associated base stations during the UL subframe. To handle this modified scenario, the subscriber station carries forward its previous UL map allocation accordingly. For example, with reference to FIG. 13B for the sake of clarity, assume that a subscriber station receives an UL map in frame f that is intended for the next frame f+1. In frame f+1, there is no downlink transmission during the DL subframe. Thus, for this modified embodiment (in contrast to the illustration of FIG. 13B), the associated subscriber stations do not transmit in frame f+1.

In frame f+2, there is a downlink transmission from the base station during the DL subframe; this implies that the base station does attempt to reserve the channel for its associated subscriber stations for the UL subframe. The subscriber station (in contrast to the illustration of FIG. 13B) therefore transmits at its spectrum allocation during the UL subframe of frame f+2. The spectrum allocation was identified in the most-recently-received UL map. In this example, the most-recently-received UL map was received in the DL subframe of frame f. Hence, with a future frame map relevancy and no subscriber station side LBT, each subscriber station waits to transmit until a frame in which the base station has transmitted during the DL subframe of a synchronous frame, and each subscriber station then transmits at a spectrum portion of the UL subframe whose allocation was identified in a most-recently-received UL map, which may have been received one, two, three, several, or more synchronous frames in the past.

Figure 14:
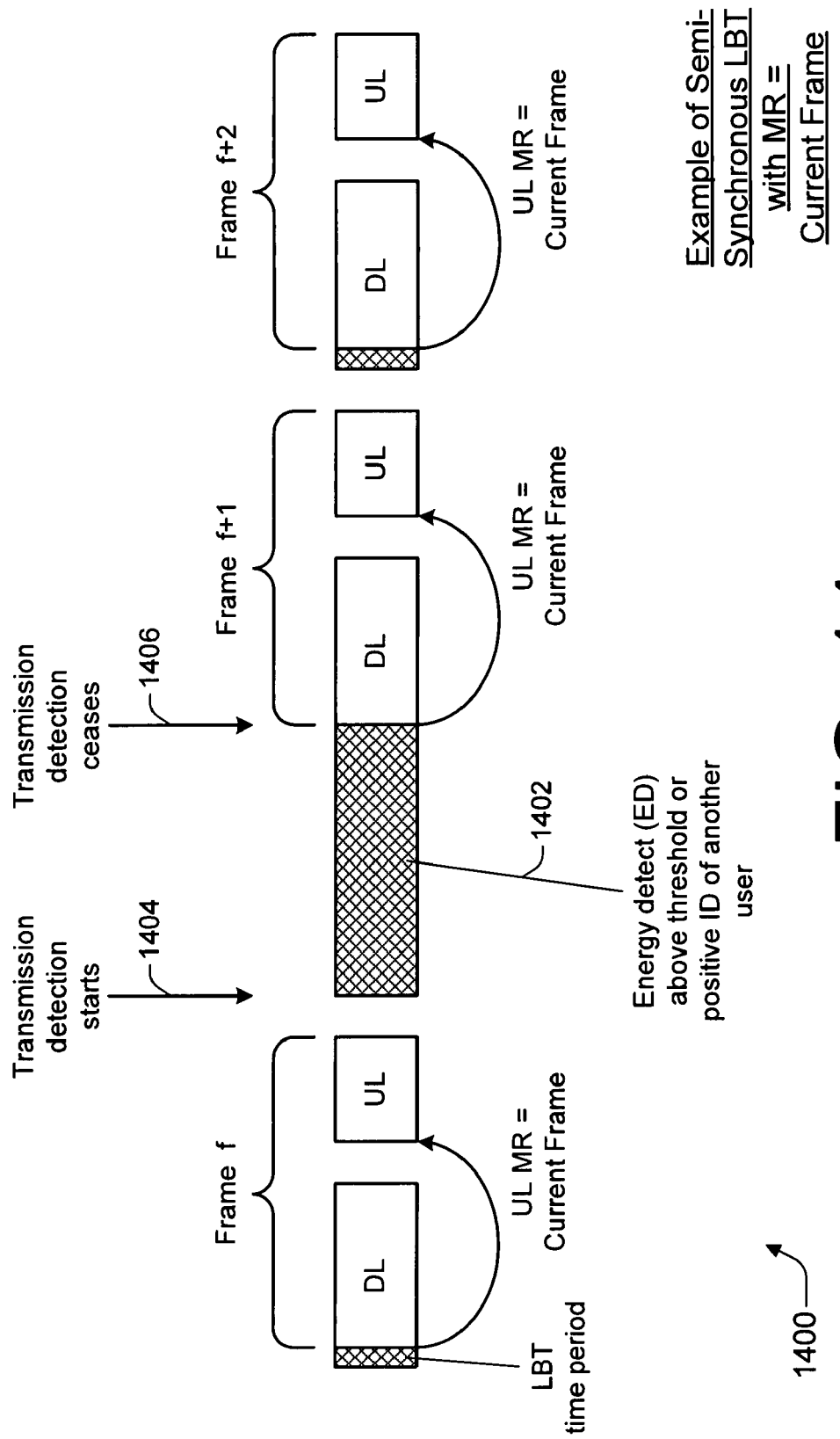
FIG. 14 is a block diagram illustrating an example semi-synchronous LBT scenario for a base station with a map relevance of a current frame.

FIG. 14 is a block diagram illustrating an example semi-synchronous LBT scenario 1400 for a base station with a map relevance of a current frame. Semi-synchronous LBT scenario 1400 illustrates three frames: frame f, frame f+1, and frame f+2. There are temporal durations reserved for a DL subframe and an UL subframe in each frame. There is also a temporal delay between frame f and frame f+1.

Prior to the DL subframe of frame f+1, the base station detects a transmission (e.g., detects energy above a threshold or positively identifies another user's valid signal) at 1402. With the LBT scenarios of FIGS. 12A, 12B, 13A, and 13B, relatively strict temporal synchronicity between frames is maintained. Hence, the base station waits until the next regular transmission interval (e.g., the next synchronous frame) before potentially transmitting a DL subframe. In contrast, with semi-synchronous LBT scenario 1400, synchronicity may be temporarily suspended and then re-established.

The base station is detecting at least one transmission during period 1402. The transmission detection starts at time 1404, and the transmission detection ceases at time 1406. At time 1406, the base station begins transmitting its DL subframe for frame f+1 without waiting for the next regular frame interval time. A new temporal synchronization cycle is therefore created with frame f+1.

This semi-synchronous LBT scenario adds complexity to the system, especially for the subscriber stations. However, it can potentially increase the overall throughput of the system. Although semi-synchronous LBT scenario 1400 is illustrated with an UL map relevance of a current frame and with only BS LBT periods, it may be implemented in alternative scenarios as well. For example, it may be applied when the UL map relevance is a future frame (e.g., analogously to FIGS. 12B and 13B). Moreover, it may be applied when LBT time periods are also reserved for subscriber stations in which those subscriber stations detecting transmission(s) do not transmit during that UL subframe (e.g., analogously to FIGS. 13A and 13B).

FIG. 15 is a block diagram illustrating an example super-packet scenario 1500 that includes transmission of a padding signal. As illustrated, super-packet scenario 1500 includes a frame 210 having a DL subframe 210(D) and an UL subframe 210(U). An inter-subframe gap 1502 is located between DL subframe 210(D) and UL subframe 210(U) of frame 210. However, inter-subframe gap 1502 may alternatively be located such that it creates a super-packet out of two subframes from different adjacent frames. Example realizations for inter-subframe gap 1502 include, by way of example but not limitation, a DL/UL gap, a transmit/receive gap (from the perspective of the base station), a turnaround gap, and so forth.

In an example embodiment, the base station transmits a padding signal 1504 during inter-subframe gap 1502. For instance, the base station may emanate a detectable level of electromagnetic radiation at the frequency for the selected channel of operation. The padding signal may or may not include data that is informative or even capable of being fully demodulated.

To users that are external to the wireless system of the base station, the transmission of padding signal 1504 during inter-subframe gap 1502 can make frame 210 (e.g., DL subframe 210(D), inter-subframe gap 1502, and UL subframe 210(U) together) appear to be one continuous packet, or a super-packet. This can retard such external users from sensing a quiet period (e.g., during inter-subframe gap 1502) and interrupting a frame 210 with their own transmissions. The transmission of padding signal 1504 of super-packet scenario 1500 can be applied to any UL map relevancy as well as to any standard synchronous or semi-synchronous systems. In an example embodiment, however, padding signal 1504 is utilized in a system that implements an UL map relevancy of a current frame.

Thus, a synchronous communication device may transmit a padding signal between the end of a downlink subframe of a synchronous fame and the beginning of an UL subframe of the synchronous frame. In an example embodiment, the padding signal may include or be replaced by a frame reservation signal for listening asynchronous devices. The frame reservation signal indicates to the listening asynchronous devices that they should not transmit during the requested time (e.g., during UL subframe 210(U)). The frame reservation signal may be, for example, a clear-to-send or CTS command (e.g., if interfering asynchronous devices are assumed to be operating in accordance with an IEEE 802.11 standard). DMA unit 316 (of FIG. 3A) may at least partially implement this frame reservation signal functionality for padding signal 1504.

A frame reservation signal can indicate to the listening asynchronous devices that they should not transmit for the time duration of the "padding" gap between the DL and the UL subframes of the synchronous system through the end of the UL subframe. Transmitting the frame reservation signal can ameliorate hidden node problems in the synchronous system, which problems are especially likely to exist for subscriber stations that are operating with less power, such as many mobile subscriber stations. Thus, transmitting the frame reservation signal can enable the base station to reserve the UL subframe for its subscriber stations by specifying that the time period of the UL subframe is the time during which no transmission is being requested. When a base station transmits such a frame reservation signal, the subscriber stations can omit performing LBT procedures prior to transmitting at their allocated portions of the uplink subframe.

Thus, a base station may transmit a frame reservation signal to listening asynchronous devices in order to reserve the channel for inter-subframe gap 1502 and/or UL subframe 210(U) on behalf of its associated subscriber stations. A base station may also transmit a frame reservation signal to listening asynchronous devices in order to reserve the channel for at least a DL subframe 210(D) on behalf of itself. Transmitting a frame reservation signal to seize a channel for a DL subframe of a targeted frame is described below with particular reference to FIGS. 16A, 16B, and 17.

Figure 16A:
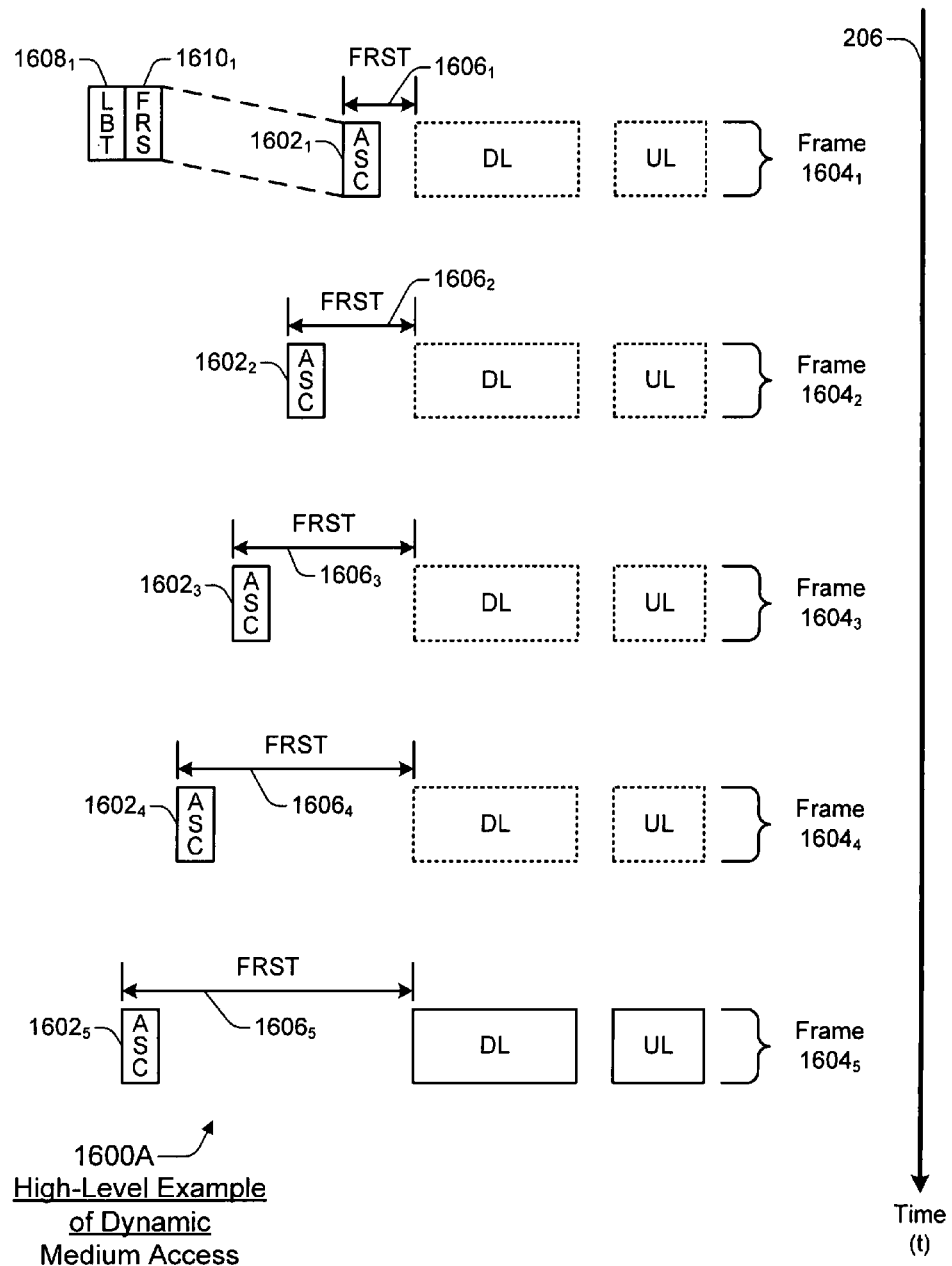
FIG. 16A is a block diagram illustrating a high-level example of dynamic medium access with the transmission of a frame reservation signal.

FIG. 16A is a block diagram 1600A illustrating a high-level example of dynamic medium access with the transmission of a frame reservation signal (FRS) 1610. As illustrated, the dynamic medium access example of block diagram 1600A includes multiple frames 1604 and multiple frame reservation send times (FRSTs) 1606 with multiple attempts to seize the channel (ASC) 1602. Specifically, five (5) attempts to seize the channel $1602_1 \ldots 1602_5$, five (5) frame reservation send times $1606_1 \ldots 1606_5$, and five (5) frames $1604_1 \ldots 1604_5$ are shown. Each frame 1604 includes a DL subframe and an UL subframe. As indicated by the time (t) arrow 206, time elapses and increases for frames $1604_1$ to $1604_5$ in the downward direction.

Figure 16B:
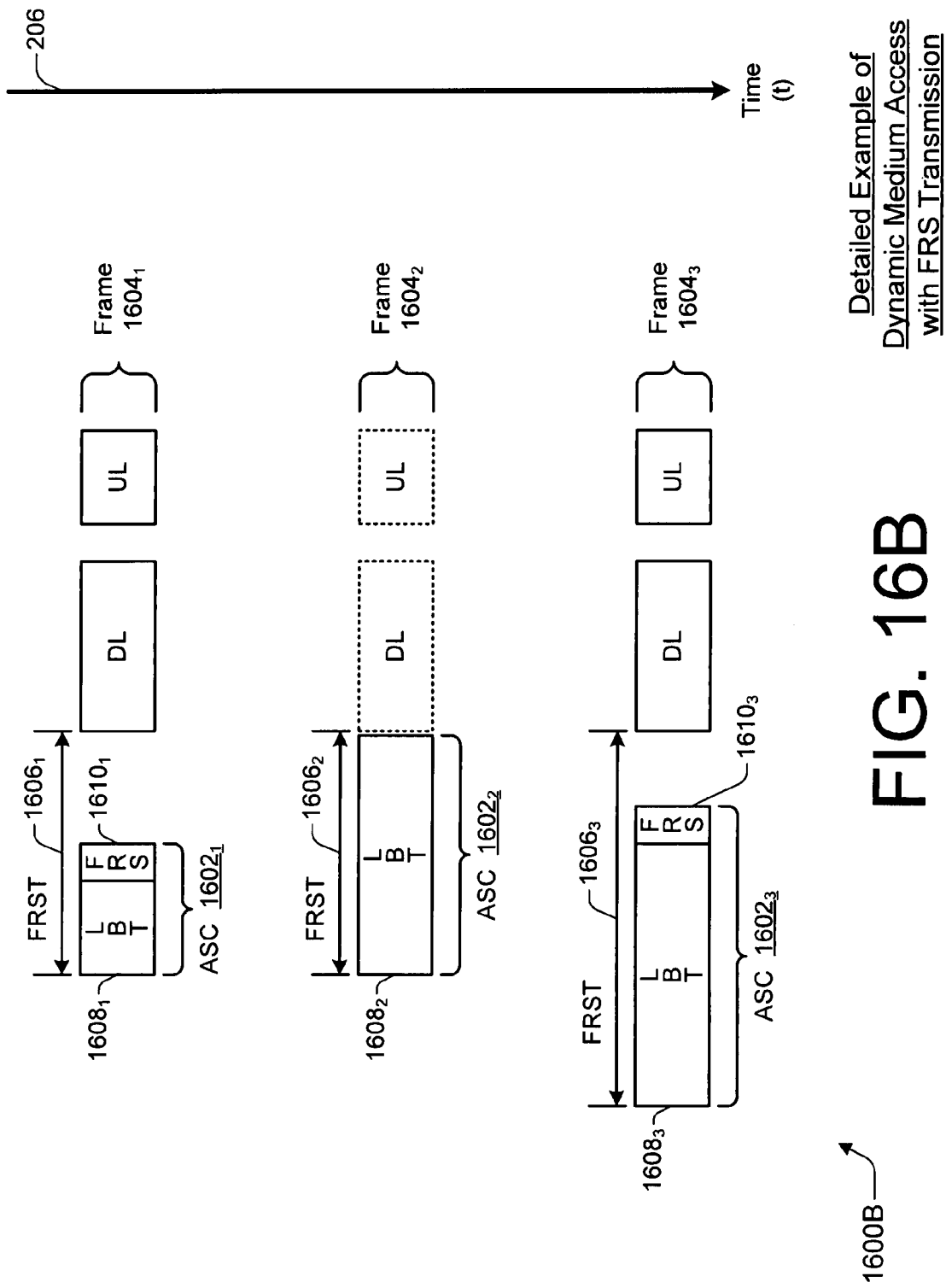
FIG. 16B is a block diagram illustrating a detailed example of dynamic medium access with the transmission of a frame reservation signal.

In an example embodiment, each attempt to seize the channel 1602 includes two portions: an LBT portion 1608 and an FRS portion 1610. At frame $1604_1$, attempt to seize the channel $1602_1$ is shown as including an LBT procedure $1608_1$ and a frame reservation signal $1610_1$. A diagram that shows an example embodiment for LBT procedure 1608 and frame reservation signal 1610 in greater detail is illustrated in FIG. 16B and described herein below. DMA unit 316 (of FIG. 3A) may at least partially implement the frame reservation signal functionality of FIGS. 16A, 16B, and 17.

Each frame reservation signal 1610 is transmitted from a synchronous wireless device, such as a base station, to reserve the channel for transmission. A frame reservation signal 1610 requests to listening devices, such as listening asynchronous devices, that no transmissions be made at the specified time. The time period that is requested to have no transmissions may be specified in frame reservation signal 1610 as a start time, as a start time plus a duration, or in any other manner. In an example embodiment, each frame reservation signal 1610 is formulated in a manner that interfering devices are assumed to understand. For example, if interfering devices are assumed to be IEEE 802.11 asynchronous devices, frame reservation signal 1610 may be formulated in accordance with a clear-to-send (CTS) command that comports with the IEEE 802.11 standard.

Generally, each attempt to seize the channel 1602 is initiated at a frame reservation send time 1606 prior to a targeted frame 1604. If the attempt to seize the channel 1602 does not successfully seize the channel for the targeted frame 1604, then the frame reservation send time 1606 is increased for the next targeted frame 1604. In other words generally, the length of frame reservation send time 1606 is increased for each succeeding targeted frame 1604 until the wireless device successfully seizes the channel and is capable of transmitting during the targeted frame 1604. In this way, the length of time prior to the beginning of a targeted frame 1604 that an attempt to seize the channel 1602 is initiated is extended after each failure.

In an example operation, a first targeted frame is frame $1604_1$. A first attempt to seize the channel $1602_1$ is initiated at a first length prior to the start of the first targeted frame $1604_1$. This first length is frame reservation send time $1606_1$. As indicated by the dashed lines of targeted frame $1604_1$, the wireless device fails to seize the channel via attempt to seize the channel $1602_1$. Consequently, the frame reservation send time is increased as indicated by frame reservation send time $1606_2$, which is longer than frame reservation send time $1606_1$. Attempt to seize the channel $1602_2$ is initiated at a time prior to targeted frame $1604_2$ that is equal to frame reservation send time $1606_2$. Again, the wireless device fails to successfully seize the channel, and the frame reservation send time 1606 is increased for the next targeted frame $1604_3$.

This process continues through targeted frames $1604_3$ and $1604_4$ until the wireless device does successfully seize the channel at targeted frame $1604_5$, as indicated by the solid lines. After each failed attempt to seize the channel, the frame reservation send time 1606 is increased. Hence, frame reservation send time $1606_3$ is shorter than frame reservation send time $1606_4$, which is shorter than frame reservation send time $1606_5$. The wireless device dynamically adjusts the length of the frame reservation send time until it reaches the length of frame reservation send time $1606_5$. The wireless device then initiates attempt to seize the channel $1602_5$, which does successfully seize the channel for targeted frame $1604_5$.

It should be understood that the attempts to seize the channel 1602, targeted frames 1604, frame reservation send times 1606, LBT procedures 1608, and frame reservation signals 1610 are not necessarily illustrated to scale in FIG. 16A (or FIG. 16B). The relative lengths and durations may differ from those that are illustrated depending on implementation. By way of example only, the duration of the downlink subframe may be 3-5 milliseconds, the length of frame reservation send time 1606 may vary from 0 to 4 milliseconds, and the duration of frame reservation signal 1602 may be 10 s to 100 s of microseconds.

The length of frame reservation send time 1606 may be increased by a set increment amount after each failure or by a varying amount, such as by an amount that grows along with the number of failed reservation attempts and/or by using the equations described below that involve a utilization ratio. After successfully reserving a channel and transmitting during a targeted frame 1604, the length of frame reservation send time 1606 may be reduced. The reduction may be a gradual decrease, or the reduction may result in the frame reservation send time being reset to a minimal default length.

The attempted seizure of the channel 1602 via an LBT procedure 1608 and frame reservation signal 1610 may be successful at any targeted frame 1604. The success may occur at fewer than or more than five frames 1604. It should be noted that frames $1604_1$, $1604_2$, $1604_3$, $1604_4$, and $1604_5$ need not immediately succeed one another in the time dimension 206. In other words, there may be intervening synchronous frames that are not targeted by a particular base station for transmission. For example, intervening synchronous frames may be assigned to another base station; intervening synchronous frames may be allocated for an EQP, and so forth.

FIG. 16B is a block diagram 1600B illustrating a detailed example of dynamic medium access with the transmission of a frame reservation signal 1610. As shown in block diagram 1600A (of FIG. 16A), each attempt to seize the channel 1602 includes an LBT procedure 1608 and (potentially) a frame reservation signal 1610. Example details regarding the temporal and functional interrelationship among each of frame reservation send time 1606, LBT procedure 1608, and frame reservation signal 1610 are shown in block diagram 1600B.

Illustrated in block diagram 1600B are three frames 1604, to $1604_3$ and three frame reservation send times $1606_1$ to $1606_3$. Attempt to seize the channel $1602_1$ includes an LBT portion $1608_1$ and an FRS portion $1610_1$. Attempt to seize the channel $1602_2$ includes an LBT portion $1608_2$ but no FRS portion 1610. Attempt to seize the channel $1602_3$ includes an LBT portion $1608_3$ and an FRS portion $1610_3$. There are therefore three LBT procedures $1608_1$ to $1608_3$ and two frame reservation signals $1610_1$ and $1610_3$. There is no frame reservation signal 1610 associated with LBT procedure $1608_2$ for reserving frame $1604_2$. As indicated by the solid lines, targeted frames $1604_1$ and $1604_3$ are successfully seized. As indicated by the dashed lines, targeted frame $1604_2$ is not successfully seized.

In an example embodiment, a frame reservation signal 1610 is transmitted after LBT procedure 1608 detects the absence of any interfering transmissions from other (e.g., asynchronous) devices. If an LBT procedure 1608 does detect interfering transmissions, then a frame reservation signal 1610 is not transmitted. If the targeted frame 1604 arrives (from a temporal perspective) while the LBT procedure 1608 is still detecting an interfering transmission, then there was no opportunity to transmit a frame reservation signal 1610 If there was no opportunity to transmit a frame reservation signal 1610 and the medium is still busy at the beginning of the DL subframe for the targeted frame, then the attempt to seize the channel was not successful.

For frame $1604_1$, at frame reservation send time $1606_1$ prior to the beginning of the DL subframe, LBT procedure $1608_1$ is started. LBT procedure $1608_1$ is continued (including repeated) until one of two situations occurs: no interfering transmission is detected or the beginning of the targeted DL subframe arrives. For frame $1604_1$, the former situation occurs. LBT procedure $1608_1$ detects the absence of any interfering transmission. In other words, LBT procedure $1608_1$ determines that the channel is available. Upon this determination, frame reservation signal $1610_1$ is transmitted to reserve the channel as of the beginning of the DL subframe of targeted frame $1604_1$. This is a successful attempt to seize the channel.

For frame $1604_2$, the latter situation occurs. In particular, the beginning of the targeted DL subframe arrives prior to a determination that the channel is available. At frame reservation send time $1606_2$ prior to the beginning of the DL subframe of targeted frame $1604_2$, LBT procedure $1608_2$ is started. LBT procedure $1608_2$ is continued until the beginning of the DL subframe. In this situation, the channel is busy, so LBT procedure $1608_2$ is detecting an interfering transmission. Consequently, no frame reservation signal 1610 can be sent to reserve the channel for targeted frame $1604_2$. This is a failed attempt to seize the channel.

For frame $1604_3$, frame reservation send time 1606 is adjusted by lengthening it. Hence, frame reservation send time $1606_3$ is longer than frame reservation send time $1606_2$. At frame reservation send time $1606_3$ prior to the beginning of the DL subframe of targeted frame $1604_3$, LBT procedure $1608_3$ is started. LBT procedure $1608_3$ is continued until no interfering transmission is detected, which means that the channel has been determined to be available. Upon this determination, frame reservation signal $1610_3$ is transmitted to reserve the channel as of the beginning of the DL subframe of targeted frame $1604_3$. This is a successful attempt to seize the channel.

Although particular example embodiments of an attempt to seize the channel 1602 have been illustrated, the timing interrelationships may be implemented in alternative manners. For example, the LBT portion 1608 may be started before the actual frame reservation send time 1606. For instance, it may be started such that if the LBT procedure 1608 determines without delay that the channel is available, the frame reservation signal 1610 may be transmitted starting at the actual frame reservation send time 1606.

It should be noted that one or more asynchronous devices may not receive or may otherwise fail to adhere to the frame reservation signal 1610. Consequently, even when an attempt to seize the channel 1602 is successful in terms of determining that the channel is available via an LBT procedure 1608 and transmitting a frame reservation signal 1610, the channel may nevertheless occasionally have interfering transmissions at the beginning of the DL subframe of the targeted frame 1604. This possibility may be addressed in a number of ways.

Generally, it may be addressed by balancing throughput versus interference avoidance. Specifically, greater weight may be given to providing throughput for the synchronous system by transmitting after an attempt to seize the channel has been successful. Alternatively, a "final" LBT procedure may be performed just prior to the beginning of the DL subframe of the targeted frame to double check that the channel is in fact free. If an interfering transmission is detected by this final LBT procedure, then the wireless device may still refrain from transmitting during the DL subframe.

The length of a current frame reservation send time may be set using any technique. In an example embodiment, a current frame reservation send time is set responsive to a previous frame reservation send time and a utilization ratio. It may also be set responsive to a minimum and a maximum frame reservation send time. The utilization ratio is determined based on a utilization goal and a current utilization.

For example, the utilization ratio may be determined based on $$\text{Utilization\_Ratio} = \left(\frac{\text{Utilization\_Goal}}{\text{Current\_Utilization}}\right)^K,$$

with the current_utilization being computed as the percent of time the base station has transmitted on the channel, including any periods for sending frame reservation signals 1602. The utilization_goal may be set by the manufacturer, by the network operator, and so forth. The K variable is a scaling factor that may be used to dynamically make the base station more or less aggressive in attempting to seize the channel. The current frame reservation send time ($FRST_n$) may then be determined responsive to $$FRST_n = \text{MIN}(\text{MAX\_FRST},(\text{MAX}(\text{Utilization\_Ratio} \times FRST_{n-1}, \text{MIN\_FRST}))),$$

with $FRST_{n-1}$ representing the previous frame reservation send time, MAX_FRST representing the maximum frame reservation send time, and MIN_FRST representing the minimum frame reservation send time. The maximum frame reservation send time may be capped by the maximum frame reservation time of an assumed interfering asynchronous system, by the amount of time until the next frame that may be targeted for transmission in the synchronous system, and so forth. The minimum frame reservation send time may be set to any value that is less than the maximum value, including zero.

The example equations above for setting the current frame reservation send time may be modified in many different manners. For example, they may be modified such that when there is no data to transmit, it is not considered a failed attempt. In other words, the utilization ratio need not be increased, which may adversely affect other devices that are sharing the channel, when there is no data to transmit. It should be understood, however, that some frames are used to maintain synchronization even when there is no other information to transmit.

Figure 17:
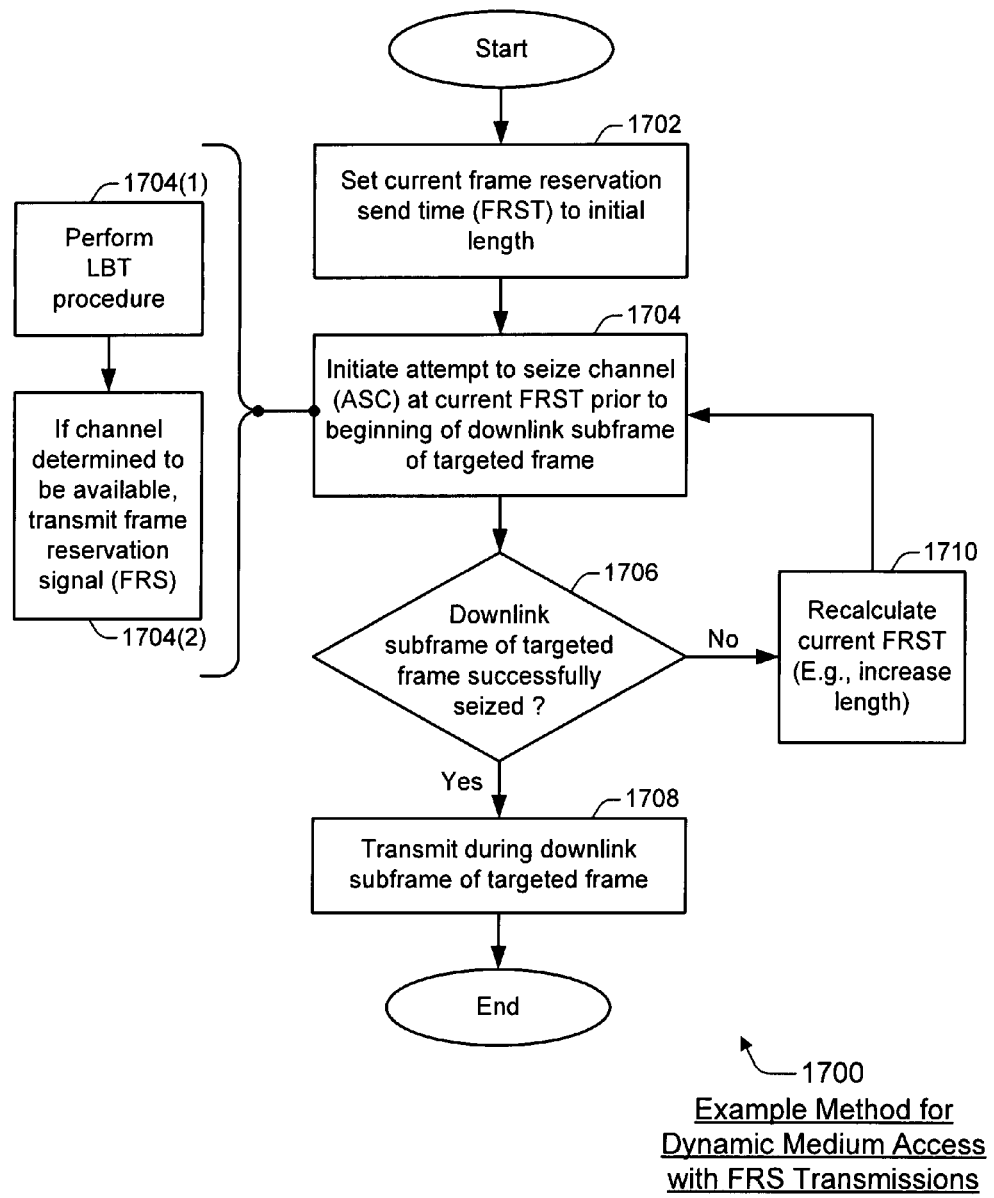
FIG. 17 is a flow diagram that illustrates an example method for implementing dynamic medium access with multiple transmissions of a frame reservation signal.

FIG. 17 is a flow diagram 1700 that illustrates an example method for implementing dynamic medium access with multiple transmissions of a frame reservation signal. Flow diagram 1700 includes seven (7) blocks 1702-1710, including blocks 1704(1) and 1704(2), for an example embodiment. Flow diagram 1700 is typically performed by a base station 102, but it may be performed by another synchronous wireless device type that wishes to reserve a channel that is being shared with one or more asynchronous wireless devices. The example dynamic medium access schemes of block diagrams 1600A and 1600B (of FIGS. 16A and 16B) are also referenced below to further explain flow diagram 1700.

At block 1702, a current frame reservation send time (FRST) is set to an initial length. For example, a current frame reservation send time 1606 may be set to an initial length that is based on a default length (including a minimum length), a randomly-set length, a previously-successful length, a utilization ratio, and so forth.

At block 1704, an attempt to seize the channel is initiated at the current frame reservation send time prior to the beginning of a downlink subframe of a targeted frame. For example, an attempt to seize the channel 1602 may be initiated at a time equal to the current frame reservation send time 1606 prior to the beginning of a DL subframe of a currently-targeted frame 1604.

Blocks 1704(1) and 1704(2) illustrate example acts for implementing block 1704. At block 1704(1), an LBT procedure is performed. For example, an LBT procedure 1608 may be performed to determine if the channel is available. If the channel is determined to be available, then at block 1704(2) a frame reservation signal is transmitted. For example, a frame reservation signal 1610 may be transmitted after an LBT procedure 1608 that does not detect (including that ceases to detect) an interfering signal.

At block 1706, it is determined if the downlink subframe of the targeted frame was successfully seized. If a frame reservation signal 1610 was transmitted when an LBT procedure 1608 determined that the channel was available, then the DL subframe may be considered to have been successfully seized. Thus, if the channel was determined to be available for the transmission of a frame reservation signal and such a signal was transmitted, then at block 1708 the wireless device may transmit during the downlink subframe of the targeted frame. Although not explicitly illustrated, the current frame reservation send time may be recalculated after successfully transmitting during the DL subframe. For example, the frame reservation send time may be decreased in length, the above equations may be implemented, and so forth.

On the other hand, if the targeted frame was not successfully seized (as determined at block 1706) by the time the DL subframe arrives, then at block 1710 the current frame reservation send time is recalculated. For example, the length of the current frame reservation send time may be increased from that of FRST $1606_2$ to that of FRST $1606_3$. The amount of the increase may be determined in any manner, including by one of those explicitly described above that involve factoring in a utilization ratio. After recalculating the length of the current frame reservation send time at block 1710, another attempt to seize the channel is initiated at the current frame reservation send time prior to the beginning of the downlink subframe of the next targeted frame at block 1704. This process is repeated until the targeted frame is successfully seized and synchronous transmission occurs at block 1708 on the downlink subframe of the targeted subframe.

Figure 18:
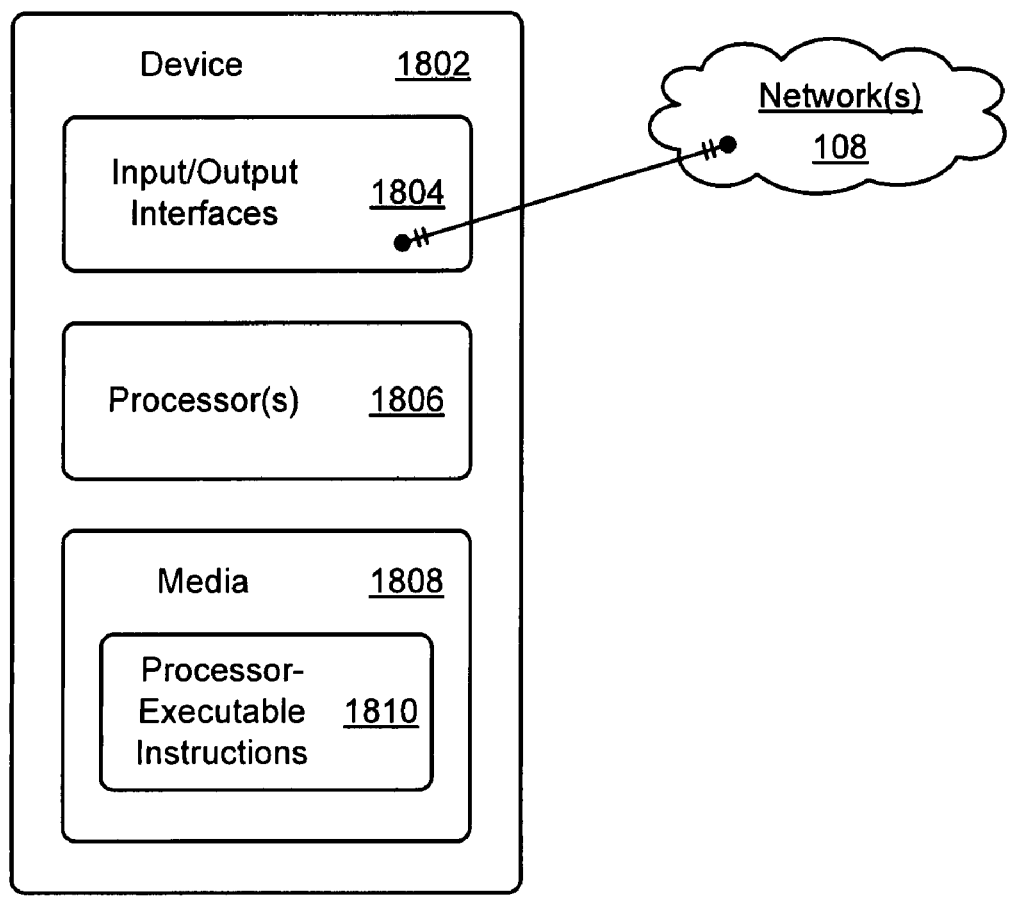
FIG. 18 is a block diagram of an example device that is capable of implementing one or more aspects of a contention-based system of the present invention.

FIG. 18 is a block diagram of an example device 1802 that is capable of implementing one or more embodiments for a contention-based protocol using, for example, processor-executable instructions and a processor. Device 1802 may be a wireless device that is capable of communicating using a wireless medium and/or a wired device that is capable of communicating using a wired medium (e.g., telephone line, coaxial cable, power line, fiber optic cable, etc.). As illustrated, device 1802 includes one or more input/output (I/O) interfaces 1804, at least one processor 1806, and one or more media 1808. Media 1808 includes processor-executable instructions 1810. A base station 102 and a subscriber station 104 may be realized as such a device 1802.

In an example embodiment, I/O interfaces 1804 enable communication through wired media and/or a wireless interface. For a base station implementation of a wireless device 1802, I/O interfaces 1804 typically provide access to other networks, such as the illustrated network(s) 108 (also of FIG. 1). For a subscriber station implementation of a wireless device 1802, I/O interfaces 1804 typically include one or more of a serial and/or parallel interface, a universal serial bus (USB) interface, another wireless interface (e.g., infrared, Bluetooth, etc.), a network interface, or any other type of interface for external communication. The external communication for a subscriber station implementation may therefore be for a local processing device or memory, a person-device interface (e.g., keyboard/keypad, speaker, microphone, screen including a touch-sensitive one, etc.), a network connection, another device, and so forth.

Generally, processor 1806 is capable of executing, performing, and/or otherwise effectuating processor-executable instructions, such as processor-executable instructions 1810. Media 1808 is comprised of one or more processor-accessible media. In other words, media 1808 may include processor-executable instructions 1810 that are executable by processor 1806 to effectuate the performance of functions by a base station 102 or a subscriber station 104.

Thus, realizations for contention-based protocol mechanisms may be described in the general context of processor-executable instructions. Generally, processor-executable instructions include programs, applications, coding, modules, objects, interfaces, components, data structures, etc. that perform and/or enable particular tasks and/or implement particular abstract data types. Processor-executable instructions may be located in separate storage media, executed by different processors, and/or propagated over or extant on various transmission media. Moreover, processor-executable instructions may be embodied as software, firmware, hardware, fixed logic circuitry, some combination thereof, and so forth.

Processor(s) 1806 (e.g., any of microprocessors, controllers, etc.) may be implemented using any applicable processing-capable technology. Media 1808 may be any available media that is included as part of and/or accessible by a base station 102 or a subscriber station 104. It includes volatile and non-volatile media, removable and non-removable media, storage and transmission media (e.g., wireless or wired communication channels), hard-coded logic media (e.g., an application-specific integrated circuit (ASIC), a field programmable gate-array (FPGA), etc.), and so forth. Media 1808 is tangible media when it is embodied as a manufacture and/or a composition of matter. By way of example only, media 1808 may include an array of disks or flash memory for longer-term mass storage of processor-executable instructions, random access memory (RAM) for shorter-term storing of instructions that are currently being executed and/or otherwise processed, link(s) on networks for transmitting communications, and so forth. Processor 1806 and processor-executable instructions 1810 of media 1808 may be combined, and even merged or otherwise intermingled, onto a single integrated circuit, especially when realized as an ASIC or similar apparatus.

Processor-executable instructions 1810 may be comprised of: units 302-316 (for a base station 102 of FIG. 3A); units 352-362 (for a subscriber station 104 of FIG. 3B); other units or modules for implementing the methods of flow diagrams 400, 500, 800A, 800B, 900, 1000, 1100A, 1100B, and 1700 (of FIGS. 4, 5, 8A, 8B, 9, 10, 11A, 11B, and 17, respectively); other units or modules for implementing functionality of the scenarios of 700A, 700B, 1200A, 1200B, 1300A, 1300B, 1400, 1500, 1600A, and 1600B (of FIGS. 7A, 7B, 12A, 12B, 13A, 13B, 15, 16A, and 16B); some combination thereof, and so forth.

The devices, actions, aspects, features, functions, procedures, modules, schemes, units, scenarios, components, etc. of FIGS. 1-18 are illustrated in diagrams that are divided into multiple blocks. However, the order, interconnections, interrelationships, layout, etc. in which FIGS. 1-18 are described and/or shown are not intended to be construed as a limitation, and any number of the blocks can be modified, combined, rearranged, augmented, omitted, etc. in any manner to implement one or more methods, apparatuses, systems, devices, procedures, media, arrangements, etc. for mechanisms for a contention-based protocol.

Moreover, although systems, apparatuses, devices, media, methods, procedures, techniques, schemes, approaches, arrangements, and other implementations have been described in language specific to structural, logical, algorithmic, and functional features and/or diagrams, it is to be understood that the invention defined in the appended claims is not necessarily limited to the specific features or acts described above. Rather the specific features and acts described above are disclosed as example forms implementing the claimed invention.

What is claimed is:

1. A communication device comprising:
    a transceiver;
    a listen-before-talk (LBT) unit configured to:
        detect a transmission from a first device during an LBT period prior to the start of a downlink subframe of a current synchronous frame, and
        instruct the transceiver to refrain from transmitting for at least a portion of the downlink subframe if the transmission from the first device is detected during the LBT period; and
    an adaptive extended quiet period (EQP) unit configured to:
        set a duty cycle level for the communication device, the duty cycle indicating a portion of a transmission period during which the communication device is permitted to transmit, the transmission period also including extended quiet periods (EQPs) during which the communication device is not permitted to transmit,
        decrease the duty cycle level if the transmission from the first device is detected during the LBT period,
        increase the duty cycle level if the transmission from the first device is not detected during the LBT period,
        decrease the duty cycle level to a predefined intermediate duty cycle level if the duty cycle level is greater than the predefined intermediate duty cycle level, and
        decrease the duty cycle level to a predefined sharing duty cycle level if the duty cycle level is less than the predefined intermediate duty cycle level.

2. A method for use in a communication device, the method comprising:
    prior to the start of a downlink subframe of a current synchronous frame, the communication device determining whether an interferer is detected;
    when the interferer is detected, the communication device refraining from transmitting for at least a portion of the downlink subframe of the current synchronous frame;
    if the portion of the downlink subframe is less than a sharing extended quiet period when an interferer is detected, increasing the portion of the downlink subframe during which the communication device refrains from transmitting towards the sharing extended quiet period, wherein the sharing extended quiet period is responsive to a type of the interferer, and if the portion of the downlink subframe is greater than a minimum extended quiet period when no interferer is detected, decreasing the portion of the downlink subframe during which the communication device refrains from transmitting towards the minimum extended quiet period.

3. A communication device comprising:

a transceiver;

a listen-before-talk (LBT) unit configured to:
- detect a transmission from a first device during an LBT period prior to the start of a downlink subframe of a current synchronous frame, and
- instruct the transceiver to refrain from transmitting for at least a portion of the downlink subframe when the transmission from the first device is detected during the LBT period;

an adaptive extended quiet period (AEQP) unit configured to:
- if the portion of the downlink subframe is less than a sharing extended quiet period when an interferer is detected, increase the portion of the downlink subframe during which the communication device refrains from transmitting towards the sharing extended quiet period, and
- if the portion of the downlink subframe is greater than a minimum extended quiet period when no interferer is detected, decrease the portion of the downlink subframe during which the communication device refrains from transmitting towards the minimum extended quiet period; and an interferer identifier unit configured to set the sharing extended quiet period in response to a type of the interferer.

* * * * *